United States Patent
Asahara et al.

(10) Patent No.: US 6,452,983 B1
(45) Date of Patent: Sep. 17, 2002

(54) DEMODULATOR FOR IMPROVING RECEPTION PERFORMANCE IN SATELLITE AND MOBILE COMMUNICATIONS

(75) Inventors: Takashi Asahara; Makoto Miyake, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/240,579

(22) Filed: Feb. 1, 1999

(30) Foreign Application Priority Data

Feb. 2, 1998 (JP) ............................................. 10-020555

(51) Int. Cl.⁷ ................................................. H04L 27/38
(52) U.S. Cl. ........................ 375/324; 375/262; 375/285; 375/326; 375/341; 375/346
(58) Field of Search ................................. 375/344, 346, 375/324, 325, 340, 262, 264, 284, 285, 326, 363, 364, 341; 455/182.2, 63, 296

(56) References Cited

U.S. PATENT DOCUMENTS

| | | | | |
|---|---|---|---|---|
| 4,899,367 A | * | 2/1990 | Sampei ........................ | 375/264 |
| 5,400,366 A | * | 3/1995 | Iwamatsu .................... | 375/344 |
| 5,423,085 A | * | 6/1995 | Lim .......................... | 455/182.2 |
| 5,596,608 A | * | 1/1997 | Sassa et al. .................. | 375/346 |
| 5,694,388 A | * | 12/1997 | Sawahashi et al. ......... | 370/206 |
| 5,875,215 A | * | 2/1999 | Dobrica ...................... | 375/344 |
| 5,917,864 A | * | 6/1999 | Asahara ..................... | 375/344 |
| 5,999,579 A | | 12/1999 | Uchishima et al. ......... | 375/347 |

FOREIGN PATENT DOCUMENTS

| | | |
|---|---|---|
| JP | 9-102806 | 4/1997 |
| WO | WO 97/03510 | 1/1997 |

OTHER PUBLICATIONS

Seiichi Sampei et al., Papers of the Institute of Electronics, Information and Communication Engineers, B–II vol. J72–B–II, No. 1 pp. 7–15, Jan., 1989 (Japanese Text).

Seiichi Sampei et al., IEEE Transactions on Vehicular Technolology, vol. 42, No. 2, May 1993.

James K. Cavers, IEEE Transactions on Vehicular Technology, vol. 40, No. 4, Nov. 1991.

* cited by examiner

*Primary Examiner*—Stephen Chin
*Assistant Examiner*—Chieh M. Fan

(57) ABSTRACT

The present invention aims to obtain a demodulator with improved receiving performance such as bit error rate characteristic by reducing the estimation error of the fading distortion even in case of transmitted signal in the channel which is much influenced by not only fading variation but also the thermal noise such as in the nonfading channel. In the demodulator of the invention has a configuration where the carrier is estimated using the known signal to perform the coherent detection. In the carrier estimator, the fading distortion estimator obtains a predetermined form of the estimation of the fading distortion using the known signal, the fading distortion compensator eliminates the fading distortion estimated from the received signal by a predetermined compensating method. The averaging unit obtains the average value of the compensated signal, of which the modulation component was eliminated from the output of the fading distortion compensator. The estimated signal generator compounds the averaged value output from the averaging unit and the estimated value of the fading distortion output from the fading distortion estimator to obtain the reference signal. The signal compensator performs the coherent detection using the reference signal obtained by the estimated signal generator.

12 Claims, 22 Drawing Sheets

DEMODULATOR FOR IMPROVING RECEPTION PERFORMANCE IN SATELLITE AND MOBILE COMMUNICATIONS

BACKGROUND OF THE INVENTION

1. Field of the Invention

The present invention relates to digital modulation/demodulation used for satellite communication, mobile communication, mobile satellite communication, in particular, to a demodulator periodically inserting a known signal into transmitted signals, estimating channel distortion from the known signal, eliminating the channel distortion using the estimated value, and performing coherent detection of the received signal.

2. Description of the Related Art

Recently, in the field of satellite communication, mobile communication, and mobile satellite communication, an investigation of digital modulation/demodulation has been actively performed. Especially, in environments of the mobile communication, a signal is received with fading. Various demodulation systems are examined, which stably operates under such fading environment. Among these systems, a system is remarkably noticed as a system capable to perform absolute coherent detection under fading environment, in which a known signal is periodically inserted into transmitted signals for calibration of channel distortion such as fading, and estimation and compensation of fading distortion is performed based on the known signal.

FIGS. 22 and 23 show conventional demodulation circuits disclosed in, for example, "Rayleigh Fading Compensation Method for 16QAM MODEM in Digital Land Mobile Radio Systems" (Sampei, Theses of The Institute of Electronics, Information and Communication Engineers (B-II), J72-II, No. 1, pp7–15 (1989–1)). In FIG. 22, a reference numeral 40 shows a quasi-coherent detecting unit, a reference numeral 50p shows a carrier estimator and 60 shows a data discriminator. In FIG. 23, a reference numeral 51 shows a fading distortion estimator and 52 shows a fading distortion compensator.

In the following, an operation of the above demodulation circuit will be explained.

Here, it is assumed a signal is modulated by QPSK (Quadriphase Phase Shift Keying). A transmitted signal $S_T(t)$, modulated by QPSK, is given by the following expression (1).

In expression (1), Re[•] shows a real part of [•] and $f_c$ shows a carrier frequency. $z_T(t)$ shows a transmitted baseband signal and is given by expression (2).

$$S_T(t)=Re[z_T(t)\exp(j2\pi f_c t)] \quad (1)$$

$$z_T(t)=z_p(t)+j\cdot z_Q(t) \quad (2)$$

In case of the above signal transmitted under the fading environment, the faded signal is represented by a narrow-band random complex signal $c(t)$ having fading power spectrum $S(f)$ multiplied to $S_T(t)$. The received signal $S_R(t)$ faded by an envelope variation $c(t)$ is given by expression (3).

$$S_R(t)=Re[c(t)z_R(t)\exp(j2\pi f_c t)+n(t)\exp(j2\pi f_c t)] \quad (3)$$

In the above expression (3), $z_R(t)$ denotes the received baseband complex signal limited by the transmitter and receiver filters. $n(t)$ denotes a white Gaussian noise.

In the following, the receiver will be discussed.

The quasi-coherent detection is performed on the received signal by the quasi-coherent detecting unit 40 with a local oscillator having oscillating frequency of $f_c - f_{off}$. A signal $S_{RB}(t)$ output from the quasi-coherent detecting unit 40 is given by the following expression (4).

$$s_{RB}(t)=Re[u(t)\exp(j2\pi f_{off}t)]$$

$$u(t)=c(t)z_R(t)+n(t) \quad (4)$$

The carrier estimator 50p obtains $c_R(t)$, the estimation value of $c(t)$ from the baseband signal $u(t)$ output from the quasi-coherent detecting unit 40. The carrier estimator 50p also eliminates the distortion caused by $c(t)$ from the received signal. Here, it is assumed that the frequency offset value $f_{off}$ is sufficiently small ($f_{off}=0$). When the known signal is supposed to be $a_p$, $z_R(t)$ becomes $z_R(t)=a_p$. Therefore, the received baseband complex signal $u(t)$ is given by the following expression (5).

Accordingly, $c_R(t)$, the estimation value of $c(t)$ is obtained by the expression (6).

$$u(t) = c(t)a_p + n(t) \quad (5)$$

$$c_R(t) = \frac{1}{a_p}u(t) \quad (6)$$
$$= c(t) + \frac{1}{a_p}n(t)$$

Based on $c_R(t)$ estimated for each known signal, the estimation sequence $c_{RS}(t)$ is represented by the following expression (7) when an insertion interval of the known signal is $T_R$.

$$c_{RS}(t) = \sum_{k=-\infty}^{\infty} c_R(k)\delta(t - kT_R) \quad (7)$$

An estimation of an interpolation sequence $c_{RI}(t)$ out of $c_{RS}(t)$ is, for example, performed by the following way using the interpolation.

In the estimation of fading distortion using the interpolation, the fading distortion of the information signal among the known signal is estimated by the interpolation using the estimation value of the fading distortion obtained by the known signal. Namely, in the fading distortion estimator 51 estimates the fading distortion $c_R(k-1)$, $c_R(k)$, $c_R(k+1)$, obtained at $t=(k-1)T_R$, $kT_R$, $(k+1)T_R$ corresponding to the known signal among the signals output from the quasi-coherent detecting unit 40 as shown in FIG. 24. The fading distortion at $t=kT_R+(m/N_R) T_R$ ($N_R$: the number of symbols corresponding to the insertion interval of the known signal) is estimated, for example, using the second order Gaussian interpolation and given by the following expression (8).

$$c_{RI}\left(k + \frac{m}{N_R}\right) = Q_{-1}\left(\frac{m}{N_R}\right)c_R(k-1) + Q_0\left(\frac{m}{N_R}\right)c_R(k) + Q_1\left(\frac{m}{N_R}\right)c_R(k+1)$$

$$Q_{-1}\left(\frac{m}{N_R}\right) = \frac{1}{2}\left\{\left(\frac{m}{N_R}\right)^2 - \frac{m}{N_R}\right\}$$

$$Q_0\left(\frac{m}{N_R}\right) = 1 - \left(\frac{m}{N_R}\right)^2$$

$$Q_1\left(\frac{m}{N_R}\right) = \frac{1}{2}\left\{\left(\frac{m}{N_R}\right)^2 + \frac{m}{N_R}\right\}$$

(8)

The fading compensator 52 eliminates the fading distortion from the received signal using the interpolation sequence $c_{RI}(k+m/N_R)$ output from the fading distortion estimator 51. Namely, a transmission function $h(k+m/N_R)$ for compensating the fading distortion is represented by the following expression (9).

From the expression (9), the fading distortion of the signal output from the quasi-coherent detecting unit 40 is compensated as shown in the expression (10).

$$h\left(k + \frac{m}{N_R}\right) = \frac{1}{c_{RI}\left(k + \frac{m}{N_R}\right)} \quad (9)$$

$$z_{RE}\left(k + \frac{m}{N_R}\right) = h\left(k + \frac{m}{N_R}\right) \cdot u\left(k + \frac{m}{N_R}\right) \quad (10)$$

$$= \frac{u\left(k + \frac{m}{N_R}\right)}{c_{RI}\left(k + \frac{m}{N_R}\right)}$$

As described above, the received signal $z_{RE}(k+m/N_R)$, of which fading distortion was compensated, can be obtained.

According to the conventional fading distortion estimation and compensation method, the fading distortion of the information signal is estimated by the interpolation using the estimation value of the fading distortion obtained by the known signal. Therefore, in the nonfading channel or Rician fading channel, where thermal noise influences a lot in addition to the fading variation, an error of the estimation value obtained by the known signal becomes large, the fading distortion cannot be compensated properly, which degrades performance of the receiver such as a bit error rate characteristic.

Further, even in the fading channel, thermal noise influences a lot when C/N (carrier power to noise power rate) is low, and the estimation error of the fading distortion estimated by the known signal becomes large. The fading distortion cannot be compensated properly, which degrades the performance of the receiver such as the bit error rate characteristic.

Further, the fading channel and the nonfading channel have opposite characteristics, so that when the performance of the receiver is improved in one of two above channels, the performance of the receiver is degraded in the other channel. It is difficult to embody the receiver having a high performance in wide range from the fading channel to nonfading channel.

SUMMARY OF THE INVENTION

The present invention is provided to solve the abovementioned problems. The invention aims to have a demodulator, where the estimation error of the fading distortion is reduced to improve the receiving performance such as the bit error rate characteristic not only in the fading channel, but also in a channel where the thermal noise influences a lot in addition to the fading variation such as the nonfading channel and Rician fading channel, or, in the fading channel where C/N rate is low, the estimation error of the fading distortion is made small to improve the receiving performance such as the bit error rate characteristic.

According to the present invention, a demodulator for estimating a carrier, and for coherent detection using specific symbols inserted in received signals has a fading distortion estimator and a fading distortion compensator using an output of the fading distortion estimator. The demodulator includes:

(1) a modulation component eliminator for filtering the received signals outputted from the fading distortion compensator, to produce estimated-received signals;

(2) an averaging unit for averaging the estimated-received signals to produce a mean (or average) value; and (3) a signal compensator for compensating the received signals using the mean value.

According to the invention, a demodulation method in a demodulator having a fading distortion estimator and a fading distortion compensator using an output of the fading distortion estimator, includes:

a modulation component eliminating step for filtering received signals including specific symbols from the fading distortion estimator, to produce estimated-received signals;

an averaging step for having a mean value of the estimated-received signals; and a signal compensation step for compensating the received signals using the mean value of the estimated-received signals.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Embodiment 1

A demodulator will be explained, which performs coherent detection with compensating an amplitude and a phase of the received signal using a reference signal generated by complex multiplying an average value of the distortion compensated signal to the estimated fading distortion.

Figure 1:
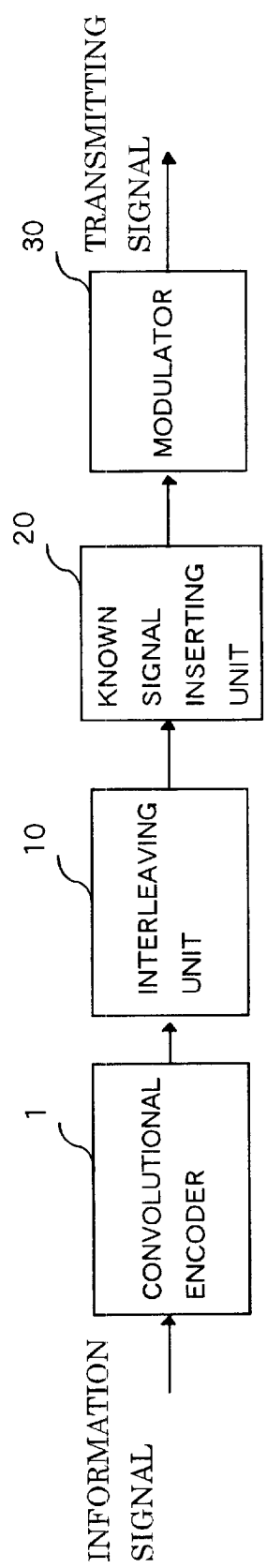
FIG. 1 shows a configuration of a transmitter according to the first embodiment of the present invention.

FIG. 1 shows a configurational example of a transmitter of the first embodiment performing coherent detection of the received signal using a known signal inserted into transmitted signals.

In the figure, a reference numeral 1 shows a convolutional encoder, 10 shows an interleaving unit, 20 shows a known signal inserting unit, and 30 shows a modulator.

In the following, an operation of the transmitter will be explained.

Figure 2:
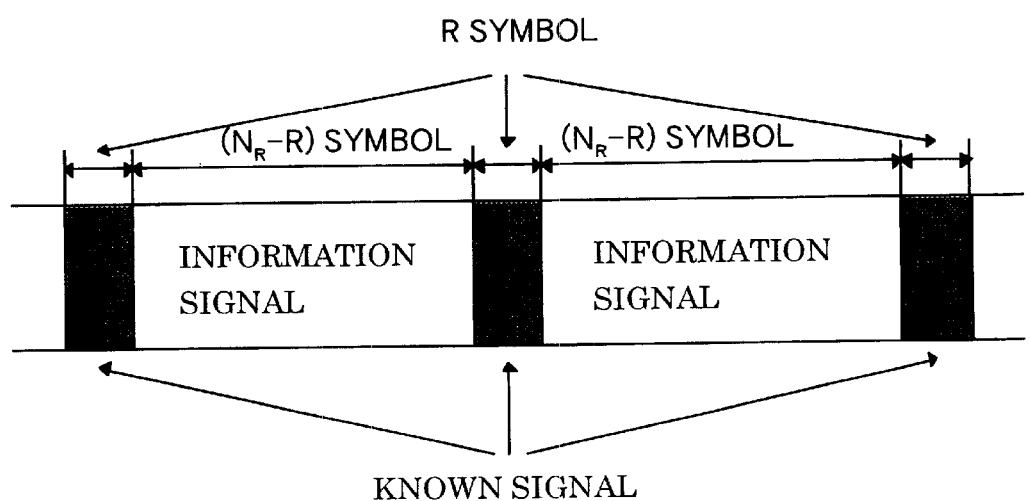
FIG. 2 shows a configuration of the transmitted signal according to the first embodiment of the present invention.

The convolutional encoder 1 implements convolutional encoding to an information signal and output the code. The interleaving unit 10 arranges the encoded data supplied from the convolutional encoder 1 according to a specific rule. The known signal inserting unit 20 periodically inserts a known signal into the data output from the interleaving unit 10 and output the data. The signal output from the known signal inserting unit 20 becomes, for example, as shown in FIG. 2, the information signal of ($N_R$–R) symbols periodically inserted the known signal of R symbol. The modulator 30 modulates the signal supplied from the known signal inserting unit 20 and outputs the modulated signal as a transmitting signal. The transmitting signal is, for example, modulated by QPSK modulating system and transmitted.

Figure 3:
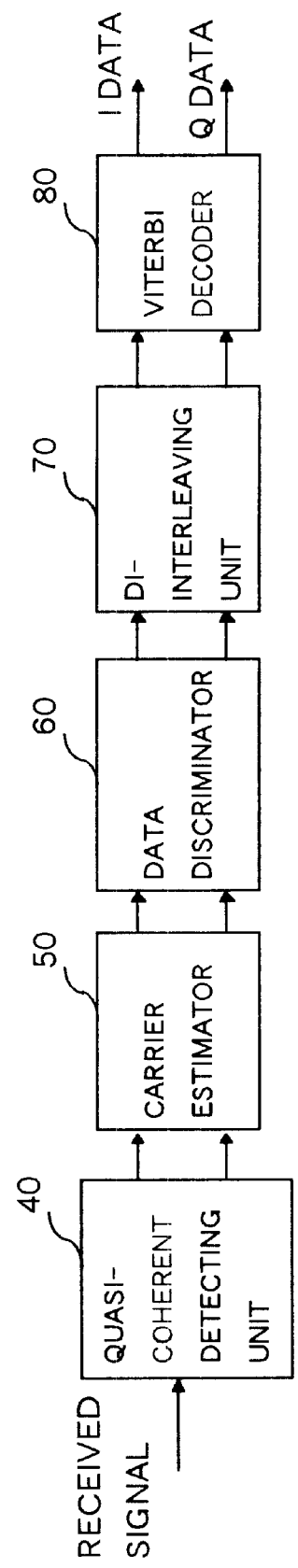
FIG. 3 shows a configuration of a receiver according to the first embodiment.

FIG. 3 shows a configurational example of the receiver of the first embodiment performing coherent detection of the received signal using the known signal inserted into the transmitted signals.

In the figure, a reference numeral 40 shows a quasi-coherent detecting unit, 50 shows a carrier estimator, 60 shows a data discriminator, 70 shows a di-interleaving unit, and 80 shows a Viterbi decoder.

An operation of the receiver will be explained in the following.

The quasi-coherent detecting unit 40 converts the frequency of the RF/IF (Radio Frequency/Intermediate Frequency) signal by orthogonal detection. The converted signal is further sampled by the A/D (analog to digital) converter to the discrete value, and is output as baseband signals of I channel and Q channel. The carrier estimator 50 obtains the estimated value $c_R(t)$ of the fading distortion c(t) to eliminate the distortion of the signal caused by fading, etc. from the baseband signals of I channel and Q channel. The data discriminator 60 discriminates the transmitted signal from the baseband signals in the I channel and Q channel, which was performed coherent detection and supplied from the carrier estimator 50. The di-interleaving unit 70 rearranges the data, which was arranged by the interleaving unit 20 according to the specific rule, to the original order. The Viterbi decoder 80 decodes the data supplied from the di-interleaving unit 70 using Viterbi algorithm.

Figure 4:
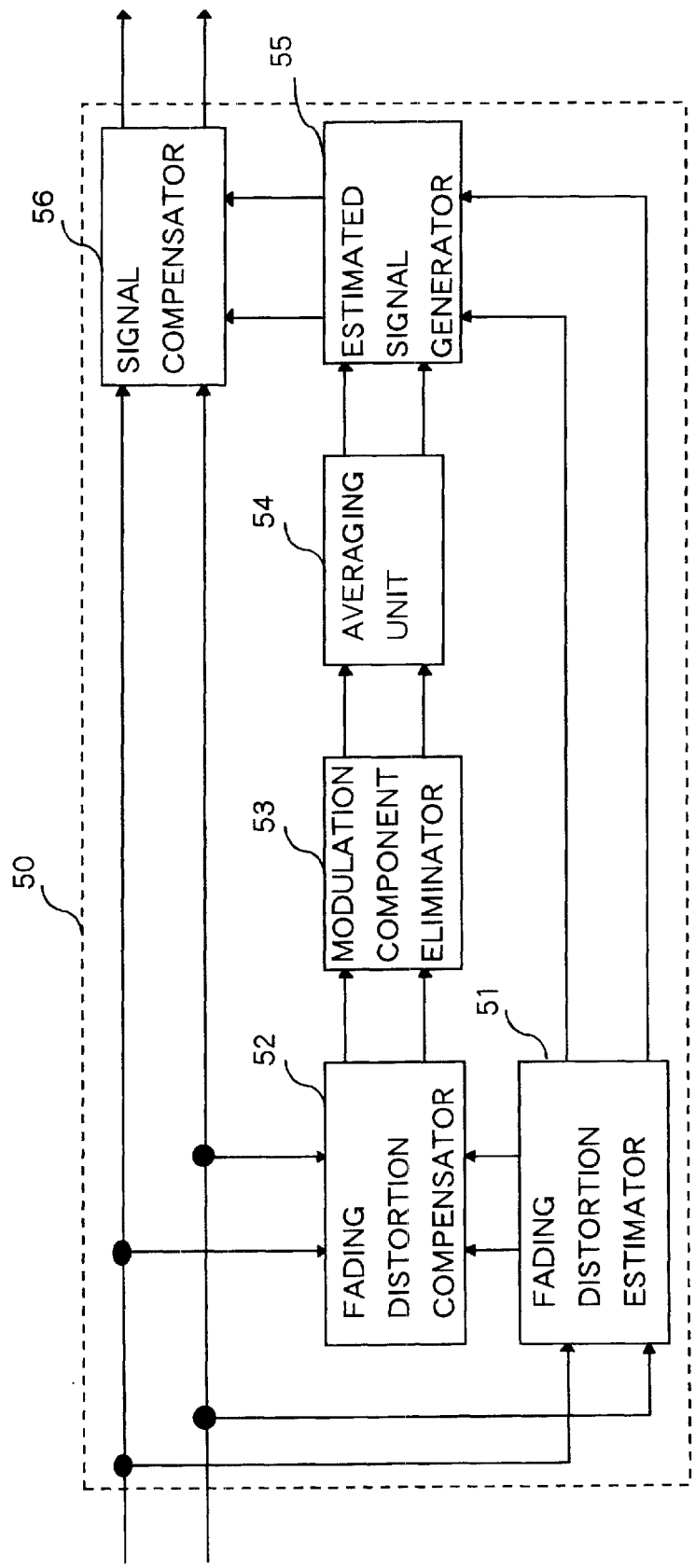
FIG. 4 shows a configuration of a carrier estimator according to the first embodiment.

FIG. 4 shows a configurational example of the carrier estimator performing coherent detection of the received signal using the known signal inserted into the transmitted signals.

In the figure, a reference numeral 51 shows a fading distortion estimator, 52 shows a fading distortion compensator, 53 shows a modulation component eliminator, 54 shows an averaging unit, 55 shows an estimated signal generator, and 56 shows a signal compensator.

An operation of the carrier estimator 50 will be described below.

The fading distortion estimator 51 estimates the fading distortion of the information signal using the known signal periodically inserted into the transmitted signals. The fading distortion compensator 52 compensates the fading distortion using the estimated value of fading distortion obtained by the fading distortion estimator 51, and eliminates the fading distortion from the signal output from the quasi-coherent detecting unit 40. The fading distortion estimator 51 and the fading distortion compensator 52 operate, for example, as described in the conventional related art.

Namely, the fading distortion $c_R(k-1)$, $c_R k$, $c_R(k+1)$, which were obtained at $t=(k-1)T_R$, $kT_R$, $(k+1)$ $T_R$ corresponding to the known signal among the signals output from the quasi-coherent detecting unit 40, are estimated. Using these estimated values, the fading distortion at time $t=kT_R+(m/N_R)T_R$ ($N_R$: the number of symbols corresponding to the insertion interval of the known signal $T_R$) is estimated by, for example, the second order Gaussian interpolation and given by the following expression (11).

$$c_{RI}\left(k + \frac{m}{N_R}\right) = Q_{-1}\left(\frac{m}{N_R}\right)c_R(k-1) + Q_0\left(\frac{m}{N_R}\right)c_R(k) + Q_1\left(\frac{m}{N_R}\right)c_R(k+1)$$
$$Q_{-1}\left(\frac{m}{N_R}\right) = \frac{1}{2}\left\{\left(\frac{m}{N_R}\right)^2 - \frac{m}{N_R}\right\}$$
$$Q_0\left(\frac{m}{N_R}\right) = 1 - \left(\frac{m}{N_R}\right)^2$$
$$Q_1\left(\frac{m}{N_R}\right) = \frac{1}{2}\left\{\left(\frac{m}{N_R}\right)^2 + \frac{m}{N_R}\right\}$$
(11)

The fading distortion compensator 52 eliminates the fading distortion from the received signal using the interpolation sequence $c_{RI}(k+m/N_R)$ supplied from the fading distortion estimator 51. Namely, a transfer function $h(k+m/N_R)$ for compensating the fading distortion is given by the following expression (12).

Using the expression (12), the fading distortion can be compensated as given by the following expression (13) from the signal supplied from the quasi-coherent detecting unit 40.

$$h\left(k + \frac{m}{N_R}\right) = \frac{1}{c_{RI}\left(k + \frac{m}{N_R}\right)}$$ (12)

$$z_{RE}\left(k + \frac{m}{N_R}\right) = h\left(k + \frac{m}{N_R}\right) \cdot u\left(k + \frac{m}{N_R}\right)$$ (13)
$$= \frac{u\left(k + \frac{m}{N_R}\right)}{c_{RI}\left(k + \frac{m}{N_R}\right)}$$

The modulation component eliminator 53 eliminates the modulation component from the received signal $z_{RE}(k+m/N_R)$, which was compensated fading distortion and supplied from the fading distortion compensator 52. For example, assuming QPSK modulation signal having four phases of 45°, 135°, 225°, and 315° as signal points, the above elimination corresponds reducing the signal having the first quadrant through the fourth quadrant to only the first quadrant.

Figure 5:
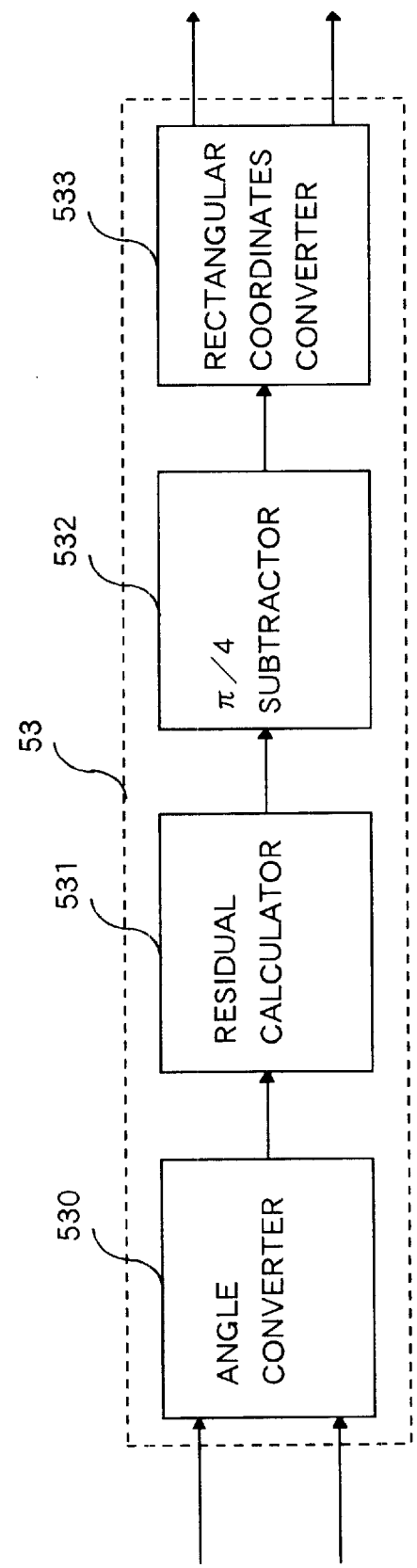
FIG. 5 shows a configuration of a modulation component eliminator according to the first embodiment.

FIG. 5 shows a configurational example of the modulation component 53. In the figure, a reference numeral 530 shows an angle converter, 531 shows a residual calculator, 532 shows a π/4 subtractor, and 533 shows a orthogonal coordinates converter.

Next, an operation of the modulation component eliminator 53 will be explained.

The angle converter 530 converts the angles of I data and crossed Q data so as to be phase data. The residual calculator 531 divides the phase data output from the angle converter 530 by 90° and outputs the residue of the division. The π/4 subtractor 532 subtracts 45° from the phase data output from the residual calculator 531. The orthogonal coordinates converter 533 converts the phase data output from the π/4 subtractor 532 into rectangular coordinates. This operation can be represented by the following expression (14), where the phase component of $z_{RE}(k+m/N_R)$ is assumed to be $\theta_{RE}(k+m/N_R)$ and the signal eliminated by the modulation component eliminator 53 is assumed to be $z_{RF}(k+m/N_R)$.

$$z_{RF}\left(k + \frac{m}{N_R}\right) = \exp\left(j\theta_{RF}\left(k + \frac{m}{N_R}\right)\right)$$ (14)
$$\theta_{RF}\left(k + \frac{m}{N_R}\right) = \mathrm{mod}\left(\theta_{RE}\left(k + \frac{m}{N_R}\right), 90\right) - 45$$
$$\theta_{RE}\left(k + \frac{m}{N_R}\right) = \tan^{-1}\left[\frac{\mathrm{Im}\left[z_{RE}\left(k + \frac{m}{N_R}\right)\right]}{\mathrm{Re}\left[z_{RE}\left(k + \frac{m}{N_R}\right)\right]}\right]$$

In the above expression, Re[•] represents a real part of [•], and Im[•] represents an imaginary part of [•].

The averaging unit 54 performs moving average of the signal of which the modulation component was eliminated by the modulation component eliminator 53 and compensated fading distortion.

Figure 6:
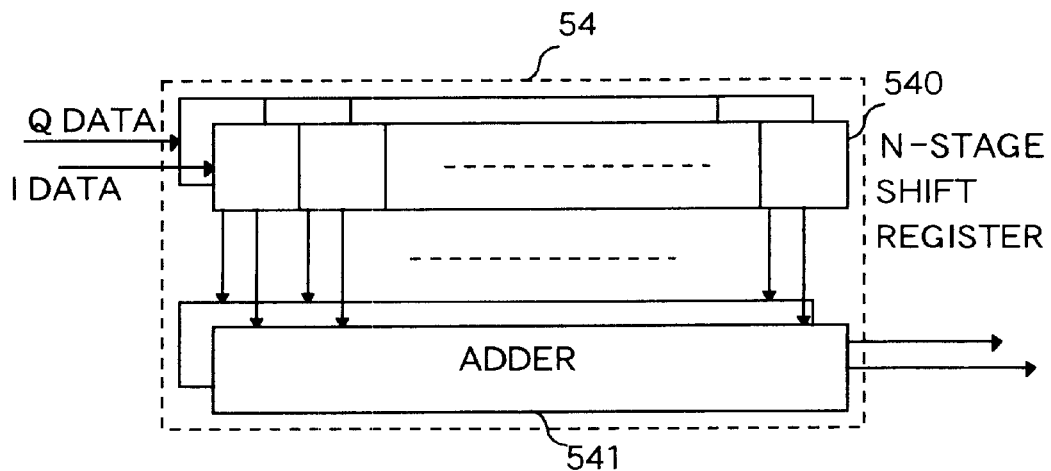
FIG. 6 shows a configuration of an averaging unit according to the first embodiment.

FIG. 6 shows a configurational example of the averaging unit 54. In the figure, a reference numeral 540 shows an N-stage shift register, and 541 shows an adder.

In the following, an operation of the averaging unit 54 will be explained.

The N-stage shift register 540 inputs I data and Q data output from the modulation component eliminator 53 every 1 symbol time $T_s$ (=$T_R/N_R$). The adder 541 performs addition to each symbol of N pieces of data stored in the N-stage shift register 540, and outputs the result of the addition. This operation will be represented by the following expression (15).

$$z_{AV}\left(k + \frac{m}{N_R}\right) = I_{AV}\left(k + \frac{m}{N_R}\right) + jQ_{AV}\left(k + \frac{m}{N_R}\right)$$ (15)
$$I_{AV}\left(k + \frac{m}{N_R}\right) = \sum_{i=-M}^{M} \mathrm{Re}\left[z_{RF}\left(k + \frac{m+i}{N_R}\right)\right]$$
$$Q_{AV}\left(k + \frac{m}{N_R}\right) = \sum_{i=-M}^{M} \mathrm{Im}\left[z_{RF}\left(k + \frac{m+i}{N_R}\right)\right]$$
$$N = 2M + 1$$

The estimated signal generator 55 compounds the estimated value $c_{RI}(k+m/N_R)$ of the fading distortion obtained by the fading distortion estimator 51 and the mean value $z_{AV}(k+m/N_R)$ output from the averaging unit 54, and generates a reference signal for estimating the carrier phase and performing coherent detection.

Figure 7:
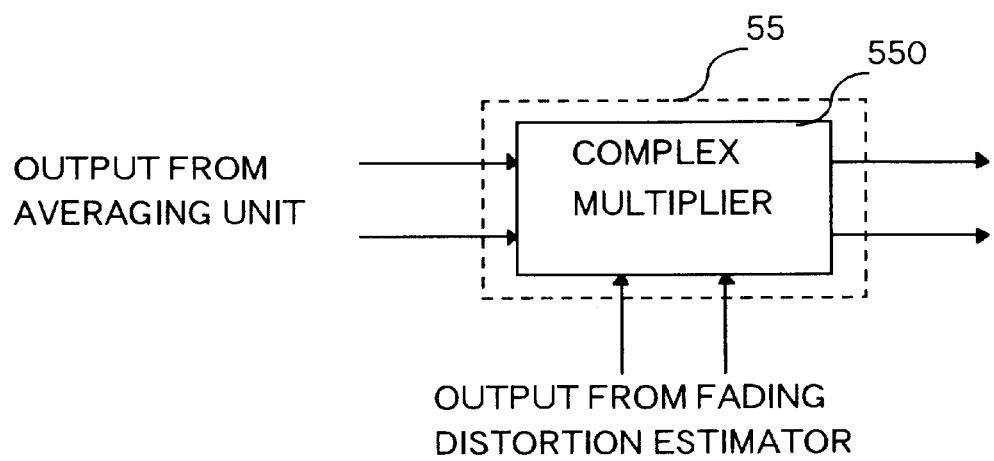
FIG. 7 shows a configuration of an estimated signal generator according to the first embodiment.

FIG. 7 shows a concept of the estimated signal generator 55. In the figure, a reference numeral 550 shows a complex multiplier. The complex multiplier 550 multiplies the signal output from the averaging unit 54 to the signal output from the fading distortion estimator 51 and outputs the result of the multiplication. This operation equals to the following expression (16) compounding and outputting the reference signal $c_{EST}(k+m/N_R)$ for coherent detection.

$$c_{EST}\left(k + \frac{m}{N_R}\right) = c_{RI}\left(k + \frac{m}{N_R}\right) \cdot z_{AV}\left(k + \frac{m}{N_R}\right) \quad (16)$$

On the other hand, on compounding the signal using only the phase, the estimated signal generator compounds a signal as given by the following expression and outputs the reference signal $c_{EST}(k+m/N_R)$.

Figure 8:
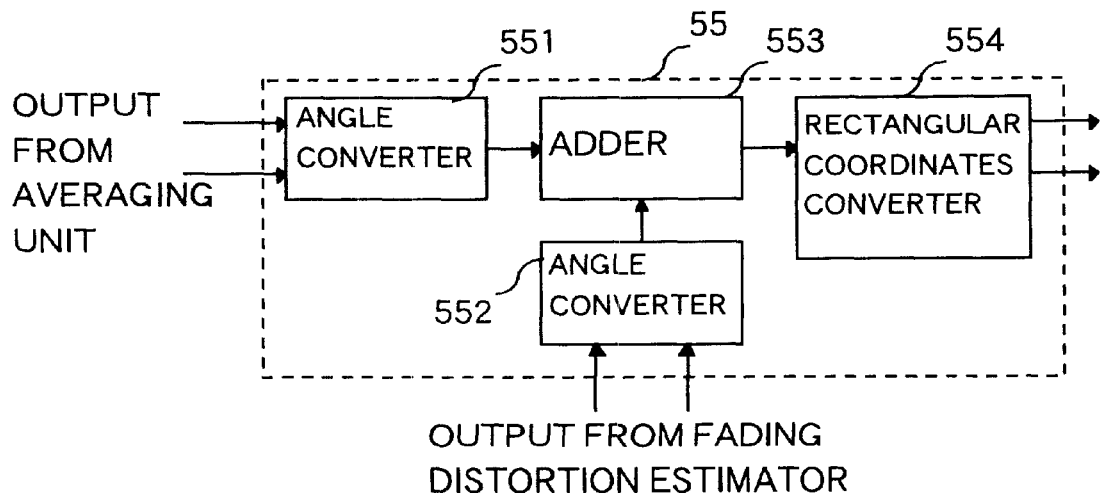
FIG. 8 shows another configuration of the estimated signal generator according to the first embodiment.

FIG. 8 shows a configurational example of the estimated signal generator 55. In the figure, a reference numerals 551 and 552 show angle converters, 553 shows an adder, and 554 shows an orthogonal coordinates converter.

Next, an operation of the estimated signal generator 55 will be explained.

The angle converter 551 converts the signal output from the averaging unit 54 into the phase data. The angle converter 552 converts the signal output from the fading distortion estimator 51 into the phase data. The adder 553 adds the phase data output from the angle converter 551 and the phase data output from the angle converter 552. The orthogonal coordinates converter 554 converts the phase data output from the adder 553 into the rectangle coordinates, and outputs I data and Q data. This operation equals to the following expression (17) generating the signal and outputting the reference signal $c_{EST}(k+m/N_R)$ for coherent detection.

The signal compensator 56 compensates the amplitude and the phase of the received signal using the reference signal $c_{EST}(k+m/N_R)$ output from the estimated signal generator 55 and performs coherent detection. By this operation, the received signal $z_{RC}(k+m/N_R)$ of the following expression (18) is obtained.

$$c_{EST}\left(k + \frac{m}{N_R}\right) = \exp\left\{j\left[\tan^{-1}\left(\frac{\operatorname{Im}\left[c_{RI}\left(k + \frac{m}{N_R}\right)\right]}{\operatorname{Re}\left[c_{RI}\left(k + \frac{m}{N_R}\right)\right]}\right) + \tan^{-1}\left(\frac{\operatorname{Im}\left[z_{AV}\left(k + \frac{m}{N_R}\right)\right]}{\operatorname{Re}\left[z_{AV}\left(k + \frac{m}{N_R}\right)\right]}\right)\right]\right\} \quad (17)$$

$$z_{RC}\left(k + \frac{m}{N_R}\right) = \frac{u\left(k + \frac{m}{N_R}\right)}{c_{EST}\left(k + \frac{m}{N_R}\right)} \quad (18)$$

Figure 9:
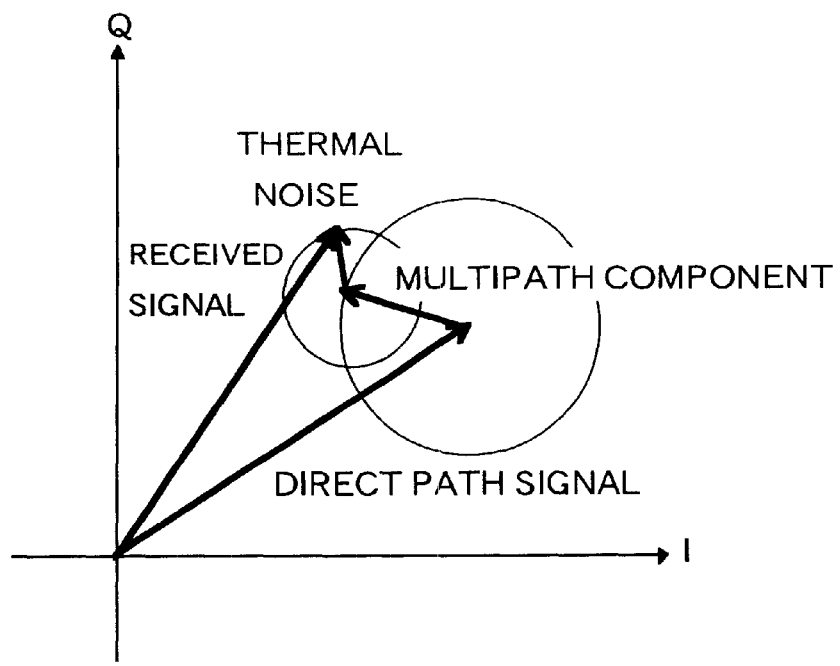
FIG. 9 shows a vector diagram of the received signal according to the first embodiment.

FIG. 9 shows a signal vector diagram of the received signal, where the channel is assumed to be Rician fading channel.

In Rician fading, a signal vector is configured by the direct path. signal and multipath component. Further, the thermal noise generated in the receiver is added to the faded signal. The fading distortion estimator 51 mainly estimates the fading distortion based on the signal compounding the direct path signal and the multipath component, and the fading distortion compensator 52 compensates the fading distortion. The averaging unit 54 estimates distortion of the signal mainly caused by the thermal noise, which was not sufficiently compensated by the fading distortion compensator 52. By compounding the estimated values obtained by the fading distortion estimator 51 and by the averaging unit 54, both signal distortion caused by the fading and by the thermal noise can be estimated and compensated to be performed coherent detection.

As has been described, in this embodiment, after the fading distortion is compensated using the known signal, the signal is averaged to detect the estimation error caused by the thermal noise. The obtained estimation error is compounded to the estimated value supplied from the fading distortion estimator to obtain the reference signal to compensate the received signal. The estimation error caused by the thermal noise, which was not sufficiently compensated, can be detected and the degradation of the characteristic caused by the fading and the thermal noise can be reduced. In the first embodiment, the signal is supposed to be modulated by the QPSK modulation method. The embodiment can be applied to PSK having N phases (N=2, 4, 8, etc.) and QAM and so on. In the above explanation, the demodulator of the embodiment includes the convolutional encoder, the Viterbi decoder, the interleaving unit, and di-interleaving unit, however, these elements are not always required to be included in the demodulator.

Embodiment 2

In the second embodiment, the demodulator having a simpler configuration than the first embodiment, which can reduce the influence of the thermal noise and can be applied to wide range of the characteristic of the channels, will be explained.

In this embodiment, the distortion is not obtained at once, but the distortion of the signal is compensated and then the distortion compensated signal is averaged by each calculation. The reference signal can be obtained as a result of this averaging. The operation from the coherent detection using the reference signal is the same as the first embodiment.

Figure 10:
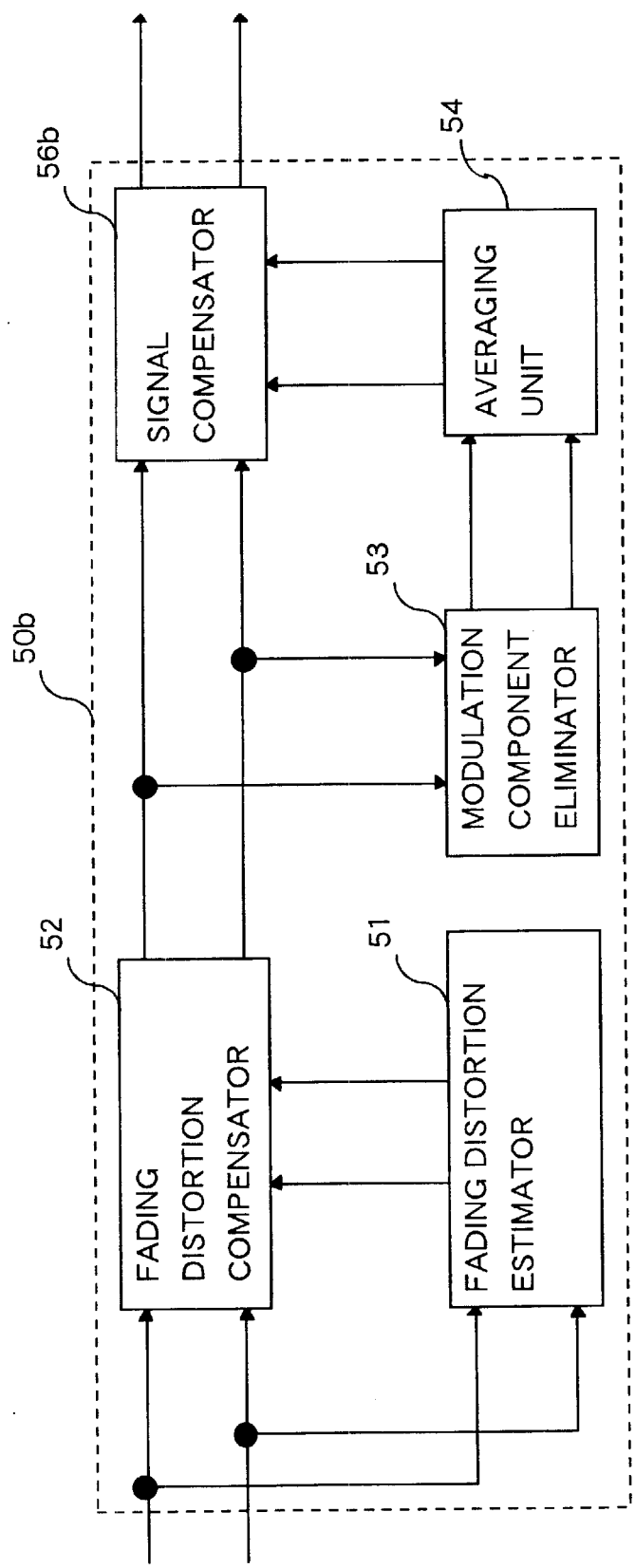
FIG. 10 shows a configuration of a carrier estimator according to the second embodiment of the invention.

FIG. 10 shows a configurational example of the carrier estimator 50b performing coherent detection of the received signal using the reference signal inserted into the transmitted signals.

In the figure, a reference numeral 51 shows the fading distortion estimator, 52 shows the fading distortion compensator, 53 shows the modulation component eliminator, 54 shows the averaging unit, and 56b shows the signal compensator.

In the following, an operation of the carrier estimator 50b will be explained.

The fading distortion estimator 51 estimates the fading variation in the information signal using the known signal periodically inserted into the received signal. The fading distortion compensator 52 compensates the fading distortion using the fading distortion estimated value estimated by the fading distortion estimator 51, and eliminates the fading distortion from the signal output from the quasi-coherent detector. The modulation component eliminator 53 eliminates the modulation component from the signal output from the fading distortion compensator 52. The averaging unit 54 averages the signal, of which the modulation component was eliminated by the modulation component eliminator 53 and of which the fading distortion was compensated. These operation are processed, for example, in the way as described in the first embodiment.

In the present embodiment, the estimated signal generator is removed. Instead, the signal compensator 56b compensates the signal output from the fading distortion estimator 52 using the signal output from the averaging unit 54. Namely, when the output from the fading distortion estimator 52 is $z_{RE}(k+m/N_R)$ and the output from the averaging unit 54 is $z_{AV}(k+m/N_R)$, the received signal $z_{RC}(k+m/N_R)$ of which the carrier phase was compensated, is given by the following expression (19) when the outputs are compounded to generate a signal including the amplitude.

The signal can be compensated in another way as represented by the following expression (20).

$$z_{RC}\left(k + \frac{m}{N_R}\right) = \frac{z_{RE}\left(k + \frac{m}{N_R}\right)}{z_{AV}\left(k + \frac{m}{N_R}\right)} \quad (19)$$

$$z_{RC}\left(k + \frac{m}{N_R}\right) = z_{RE}\left(k + \frac{m}{N_R}\right)\exp\left(-j\theta_{AV}\left(k + \frac{m}{N_R}\right)\right) \quad (20)$$

$$\theta_{AV}\left(k + \frac{m}{N_R}\right) = \tan^{-1}\left(\frac{\mathrm{Im}\left[z_{AV}\left(k + \frac{m}{N_R}\right)\right]}{\mathrm{Re}\left[z_{AV}\left(k + \frac{m}{N_R}\right)\right]}\right)$$

As has been described, the demodulator of the second embodiment first compensates the fading distortion using the known signal, then averages the signal to detect the estimation error due to the thermal noise, and the signal is compensated. The embodiment enables to obtain the demodulator detecting the estimation error due to the thermal noise, which was not sufficiently compensated by the fading distortion compensator, and having a simpler configuration than the first embodiment. Accordingly, the demodulator can reduce the degradation of the performance caused by the fading and the thermal noise.

Embodiment 3

In the third embodiment, the case where the fading distortion is estimated not only using the distortion at the location of the known signal, but adding and averaging the signal after weighting the distortion of the previous signal and the subsequent signal. In this way, the distortion can be estimated based on the fading variation with reducing the estimation error due to the thermal noise.

Figure 11:
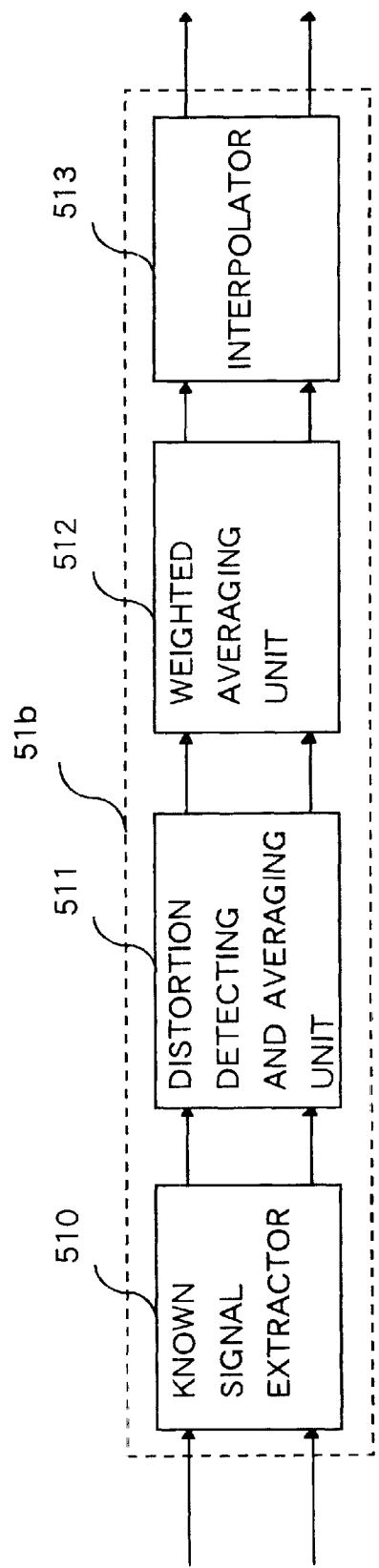
FIG. 11 shows a configuration of a fading distortion estimator according to the third embodiment of the invention.

In the first embodiment, the carrier estimator performs the coherent detection of the received signal using the known signal inserted into the transmitted signals. On the contrary, in the third embodiment, the fading distortion estimator 51b is configured as shown in FIG. 11. Except the configuration of the fading distortion estimator 51b, the demodulator of the third embodiment has the same configuration of the first embodiment as shown in FIG. 4, or of the second embodiment as shown in FIG. 10.

In FIG. 11, a reference numeral 510 shows a known signal extractor, 511 shows a distortion detecting and averaging unit, 512 shows a weighted averaging unit, and 513 shows an interpolator.

In the following, an operation of the fading distortion estimator 51b will be explained.

In the third embodiment, it is assumed that the known signal having R symbols is periodically inserted with an information signal interval of $(N_R-R)$ symbols as shown in FIG. 2.

Before obtaining the fading distortion estimated value $c_{RI}(k+m/N_R)$, the fading distortion estimated value $c_{RB}(k)$ of the known signal having consecutive R symbols is required to be obtained. The known signal extractor 510 extracts the signal corresponding to the known signal. Hereinafter, the extracted known signal having consecutive R symbols is called as a known signal block. The distortion detecting and averaging unit 511 detects the fading distortion in the known signal block output from the known signal extractor 510, and averages the signal. For example, a case of R=2 symbols will be explained below.

Here, a timing for each symbol is assumed to be as given by the following expression (21).

In this case, $T_R$ shows an insertion interval of the known signal, and $N_R$ shows the number of symbols corresponding to the interval. The timing of the first symbol is assumed to be m=0 and conditions are assumed to be as given by the following expression (22).

$$t = kT_R + \left(\frac{m}{N_R}\right)T_R \quad (k, m = 0, 1, 2, \ldots) \quad (21)$$

In the above expressions, the estimated value $c_{RB}(k)$ of the fading distortion in the known signal block is obtained using the estimated values $c_R(k)$, $c_R(k+1N_R)$ of the fading distortion in each known signal, which is given by the following expression (23).

$$c_{RB}(k) = \frac{1}{2} \cdot \left\{c_R(k) + c_R\left(k + \frac{1}{N_R}\right)\right\} \quad (23)$$

The weighted averaging unit 512 performs the weighted average of the estimated value $c_{RB}(k)$ of the fading distortion output from the distortion detecting and averaging unit 511 as shown in the following expression (24).

$$c_{RBA}(k) = \sum_{i=-k}^{k} a^{|i|} c_{RB}(k+i) \quad (24)$$

In the above expression, K represents a variable deciding the number of known signal blocks for weighted averaging. In this way, as well as the estimated value of the fading distortion at the location of known signal block, the estimated values of fading distortion in the previous and subsequent known signal blocks are weighted and added. The added result becomes the estimated value of the fading distortion at that location.

Figure 24:
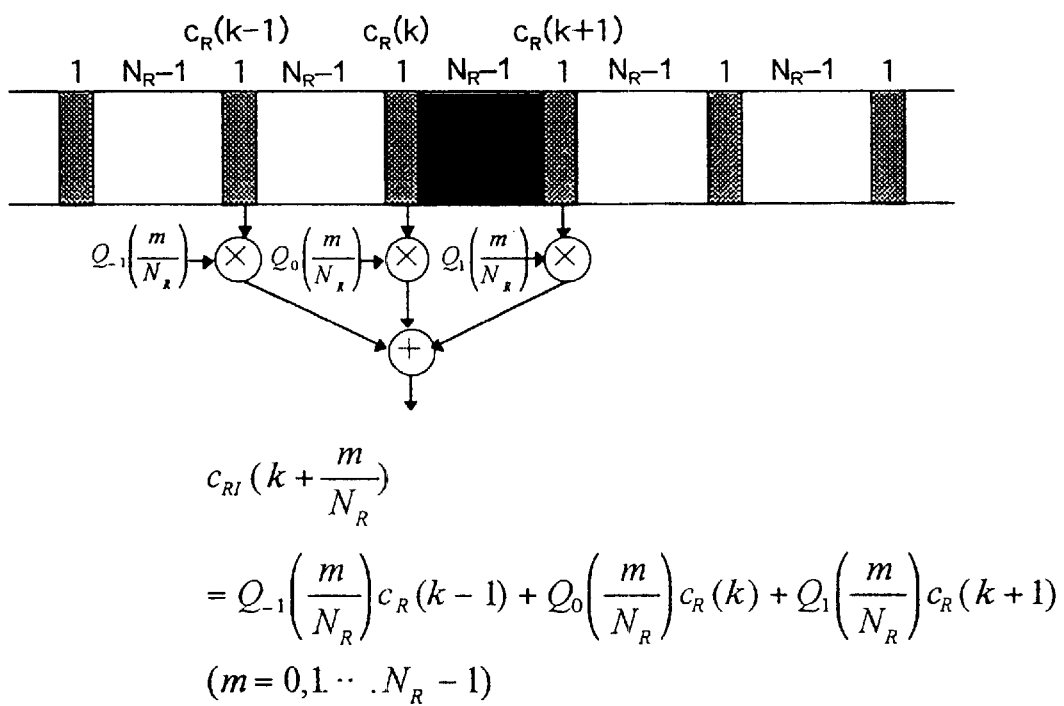
FIG. 24 shows an example of estimation of fading distortion according to the conventional art.

The interpolator 513 estimates the fading distortion $c_{RI}(k+m/N_R)$ in the information signal using the estimated value $c_{RBA}(k)$ of the fading distortion at the known signal location output from the weighted averaging unit 512. The conventional way of the interpolation as shown in FIG. 24 can be applied to the above estimation of the fading distortion $c_{RI}(k+m/N_R)$ in the information signal using the estimated value of fading distortion $c_{RBA}(k)$. The estimated value $c_{RI}(k+m/N_R)$ of fading distortion in the information signal can be also obtained by, for example, the second order Gaussian interpolation, and the estimated value can be represented by the following expression (25).

In another way, instead of the second order Gausian interpolation, using the second approximation obtained by the method of least squares, the estimated value $c_{RI}(k+m/N_R)$ of the fading distortion in the information signal, and the estimated value can be represented by the following expression (26).

$$C_{RI}\left(k + \frac{m}{N_R}\right) = Q_{-1}\left(\frac{m}{N_R}\right)c_{RBA}(k-1) + Q_0\left(\frac{m}{N_R}\right)c_{RBA}(k) + \quad (25)$$
$$Q_1\left(\frac{m}{N_R}\right)c_{RBA}(k+1)$$

$$Q_{-1}\left(\frac{m}{N_R}\right) = \frac{1}{2}\left\{\left(\frac{m}{N_R}\right)^2 - \frac{m}{N_R}\right\}$$

$$Q_0\left(\frac{m}{N_R}\right) = 1 - \left(\frac{m}{N_R}\right)^2$$

$$Q_1\left(\frac{m}{N_R}\right) = \frac{1}{2}\left\{\left(\frac{m}{N_R}\right)^2 + \frac{m}{N_R}\right\}$$

$$c_{RI}(t_m) = c_0 + c_1 t_m + c_2 t_m^2 \quad (26)$$

$$C = R_{yy}^{-1}(3)R_{yu}(3)$$

-continued $$\begin{cases} R_{yy}(3) = Y^t(3)Y(3) \\ R_{yu}(3) = Y^t(3)u(3) \end{cases}$$

$$C = \begin{bmatrix} c_0 \\ c_1 \\ c_2 \end{bmatrix}, y_t = \begin{bmatrix} 1 \\ t_m \\ t_m^2 \end{bmatrix}, Y(3) = \begin{bmatrix} y_1^t \\ y_2^t \\ y_3^t \end{bmatrix}, u(3) = \begin{bmatrix} c_{RBA}(k-1) \\ c_{RBA}(k) \\ c_{RBA}(k+1) \end{bmatrix}$$

$$t_m = k + \frac{m}{N_R}$$

In the above expression, $X^t$ represents the transposed matrix X.

In another way, instead of the second order Gausian interpolation, using the Wiener interpolation, the estimated value $c_{RI}(k+m/N_R)$ of the fading distortion in the information signal, and the estimated value can be represented by the following expression (27).

In the expression (27), ρ represents a correlation function, which can be given by a time correlation function as obtained by the following expression (28), considering the fading process.

$$C_{RI}(t_m) = H^+ C \tag{27}$$

$$H = R^{-1} W$$

$$C = \begin{bmatrix} c_{RBA}(k-1) \\ c_{RBA}(k) \\ c_{RBA}(k+1) \end{bmatrix}, H = \begin{bmatrix} h_0(t_m) \\ h_1(t_m) \\ h_2(t_m) \end{bmatrix}, R = \begin{bmatrix} r_{11} & r_{12} & r_{13} \\ r_{21} & r_{22} & r_{23} \\ r_{31} & r_{32} & r_{33} \end{bmatrix},$$

$$W = \begin{bmatrix} w_{m1} \\ w_{m2} \\ w_{m3} \end{bmatrix};$$

$$r_{ij} = \rho_{ij}$$

$$w_{mj} = \rho_{mj}$$

$$t_m = k + \frac{m}{N_R}$$

$$\rho_{ij} = |a_p|^2 \sigma_c^2 J_0(2\pi f_D T_S N_R |i-j|) + \delta_{ij}$$

$$\rho_{mj} = a_p \sigma_c^2 J_0(2\pi f_D T_S |(j-2)N_R - m|) \tag{28}$$

In the above expression, + (dagger) represents a conjugated transposition, $a_p$ represents the known signal, $\sigma_c^2$ represents dispersion of the amplitude of received signal, $J_0(\cdot)$ represents the zero-order Bessel function of the first kind, $f_D T_S$ represents normalized maximum Doppler frequency, and $\delta_{ij}$ represents Kronecker's delta.

As has been described, the demodulator of the embodiment averages the estimated value of the fading distortion obtained by the known signal block by adding weighted value to the previous and subsequent signal blocks of the known signal block, and then the interpolation is implemented to estimate the fading distortion. The embodiment can reduce the estimation error at the known signal location due to the thermal noise, and degradation of the characteristic caused by the thermal noise with following the fading variation.

In the third embodiment, the value of the weighted coefficient is assumed as given by the expression (24). The weighted coefficient can be set independently.

Embodiment 4

In the fourth embodiment, another demodulator will be explained, where the precision of eliminating the modulation component is improved, the number of stages required for averaging the signal is decreased in the averaging unit, and thus the load of the averaging is lessened.

Figure 12:
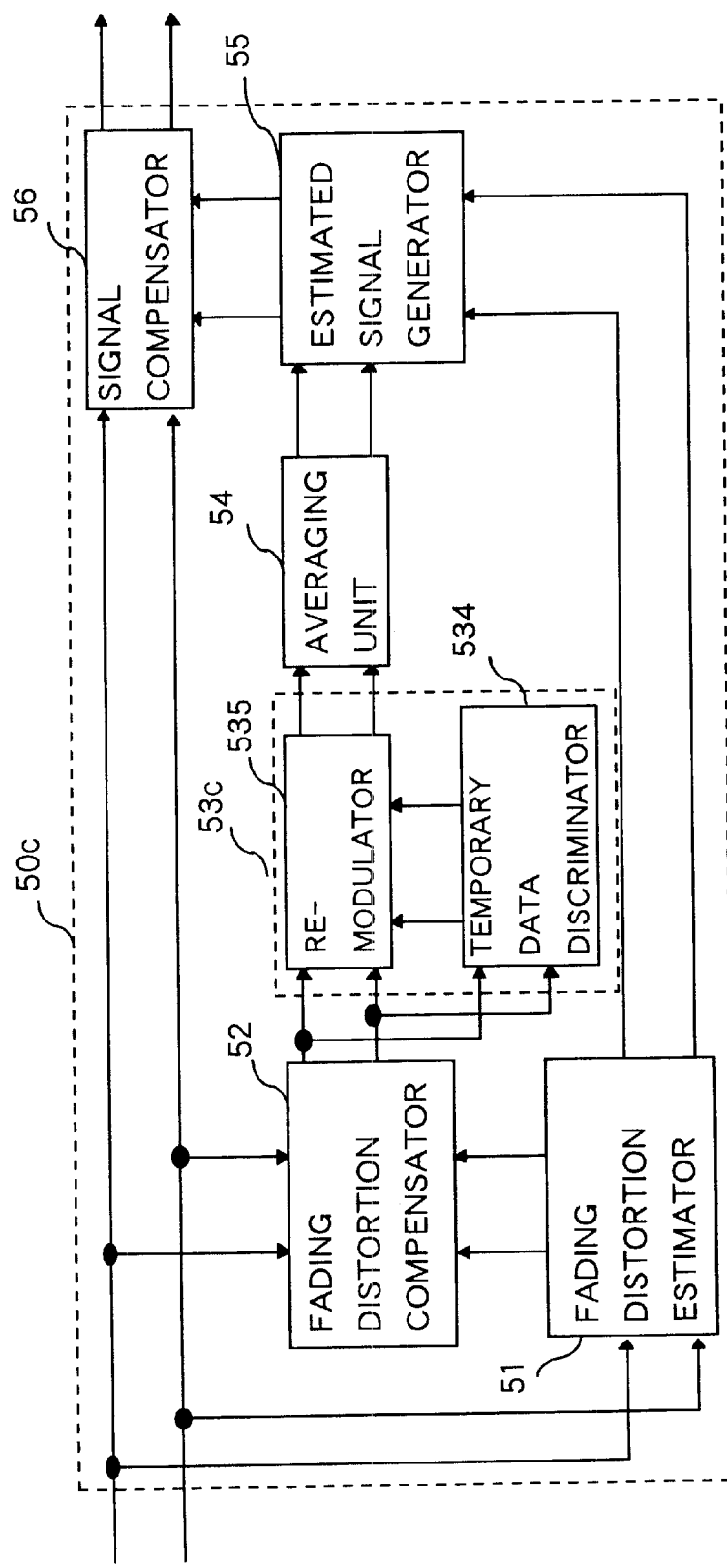
FIG. 12 shows a configuration of a carrier estimator according to the fourth embodiment of the invention.

FIG. 12 shows a configuration of another carrier estimator of the first embodiment performing the coherent detection of the received signal using the known signal inserted into the transmitted signals. The modulation component eliminator of the first embodiment is now configured as shown in FIG. 12.

In the figure, a reference numeral 534 shows a temporary data discriminator, 535 shows a re-modulator. The other elements of the configuration of FIG. 12 are the same as elements of the first embodiment shown in FIG. 4. These are assigned the same reference numerals, and the explanation of the numerals are omitted.

An operation of a carrier estimator 50c will be explained in the following.

The temporary data discriminator 534 temporarily discriminates the transmitted signal from the output signal of the fading distortion compensator 52. The re-modulator 535 eliminates the modulation component by re-modulating the signal using the decoded data discriminated and output by the temporary data discriminator 534. This operation is represented by the following expression (29), where the output of the fading distortion compensator 52 is $z_{RE}(k+m/N_R)$, and the signal of which the modulation component is eliminated is $z_{RF}(k+m/N_R)$.

$$z_{RF}\left(k + \frac{m}{N_R}\right) = z_{RE}\left(k + \frac{m}{N_R}\right) \exp\left[-j\left(\theta_D\left(k + \frac{m}{N_R}\right) + 45\right)\right] \tag{29}$$

$$\theta_D\left(k + \frac{m}{N_R}\right) = 90 \times \text{Int}\left[\text{mod}\left(\theta_{RE}\left(k + \frac{m}{N_R}\right), 360\right)/90\right]$$

$$\theta_{RE}\left(k + \frac{m}{N_R}\right) = \tan^{-1}\left[\frac{\text{Im}\left[z_{RE}\left(k + \frac{m}{N_R}\right)\right]}{\text{Re}\left[z_{RE}\left(k + \frac{m}{N_R}\right)\right]}\right]$$

In the above expression, Int[•] means to convert into an integral value by cutting off the decimal part.

As described above, after the output signal of the fading distortion compensator is temporarily discriminated, the modulation component is eliminated by re-modulating the signal using the output from the temporary data discriminator. Since the carrier estimator of the present embodiment can eliminate the modulation component more precisely than eliminating the modulation component by Nth power law and so on, which reduces the estimation error generated by the averaging unit, and the performance of the receiver has been improved. Further, the number of stages required for averaging to obtain the same performance can be decreased, thus the load of the averaging unit can be lessened.

Figure 13:
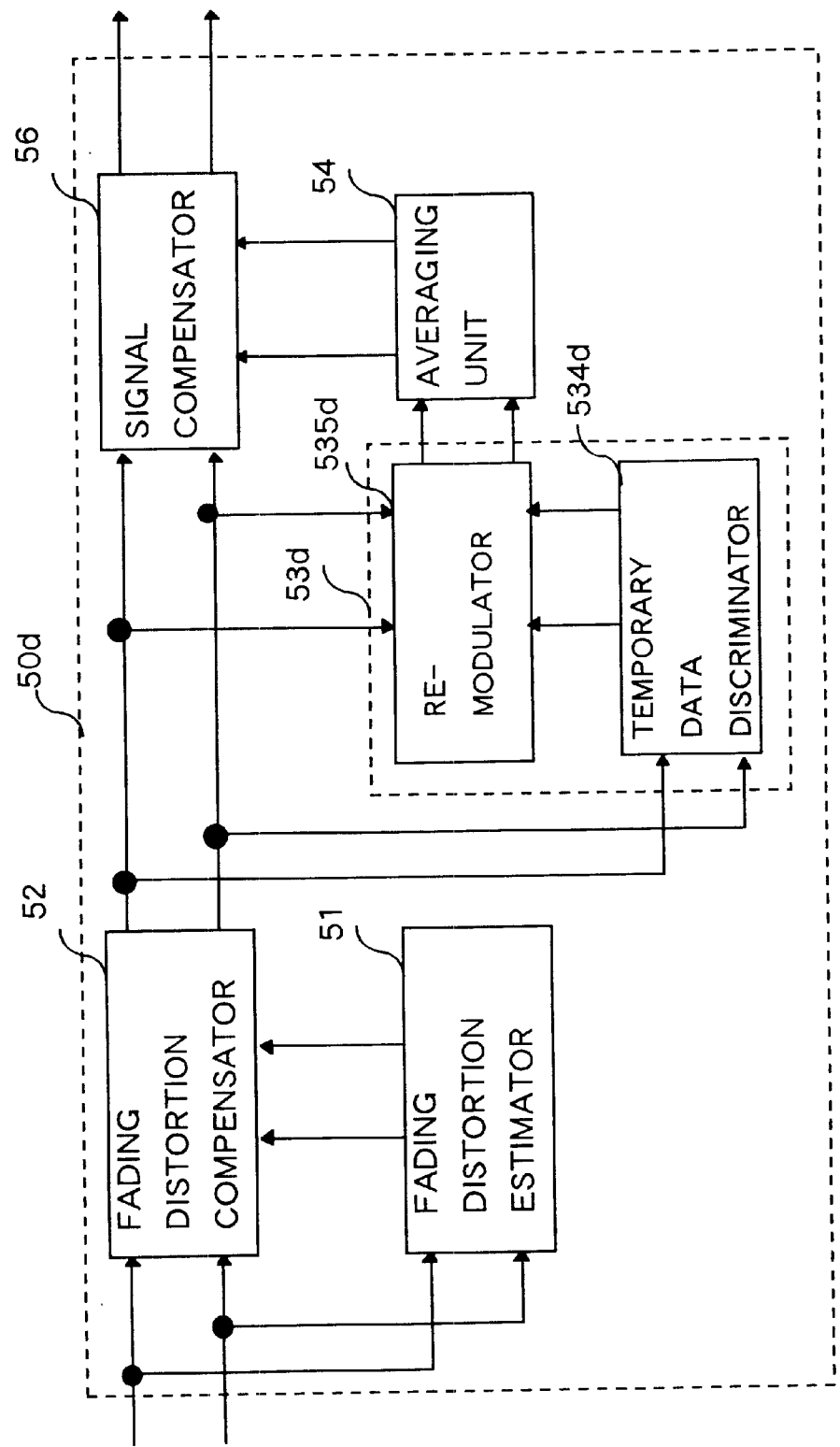
FIG. 13 shows another configuration of the carrier estimator according to the fourth embodiment.

FIG. 13 shows a configuration of another carrier estimator of the second embodiment, which performs coherent detection of the received signal using the known signal inserted into the transmitted signals. The modulation component eliminator of the second embodiment is now configured as shown in FIG. 13.

In the figure, a reference numeral 534d shows a temporary data discriminator, and 535d shows a re-modulator. The other elements of the configuration of FIG. 13 are the same as ones of the second embodiment shown in FIG. 10.

In the following, an operation of a carrier estimator 50d will be explained.

The temporary data discriminator 534d temporarily discriminates the transmitted data from the output signal of the fading distortion compensator 52. The re-modulator 535d eliminates the modulation component by re-modulating the signal using the decoded data discriminated and output by the temporary data discriminator 534d. These operation are performed in the same way as, for example, the demodulator of the fourth embodiment configured as shown FIG. 12.

As described above, after the output signal of the fading distortion compensator is temporarily discriminated, the modulation component is eliminated by re-modulating the signal using the output from the temporary data discriminator. Since the carrier estimator of the present embodiment can eliminate the modulation component more precisely than Nth power law and so on, which reduces the estimation error generated by the averaging unit, and the performance of the receiver has been improved. Further, the number of stages required for averaging can be decreased, thus the load of the averaging unit can be lessened.

Embodiment 5

In the fifth embodiment, another demodulator will be explained, where the precision of eliminating the modulation component is improved, and thus the load of the averaging is lessened.

Figure 14:
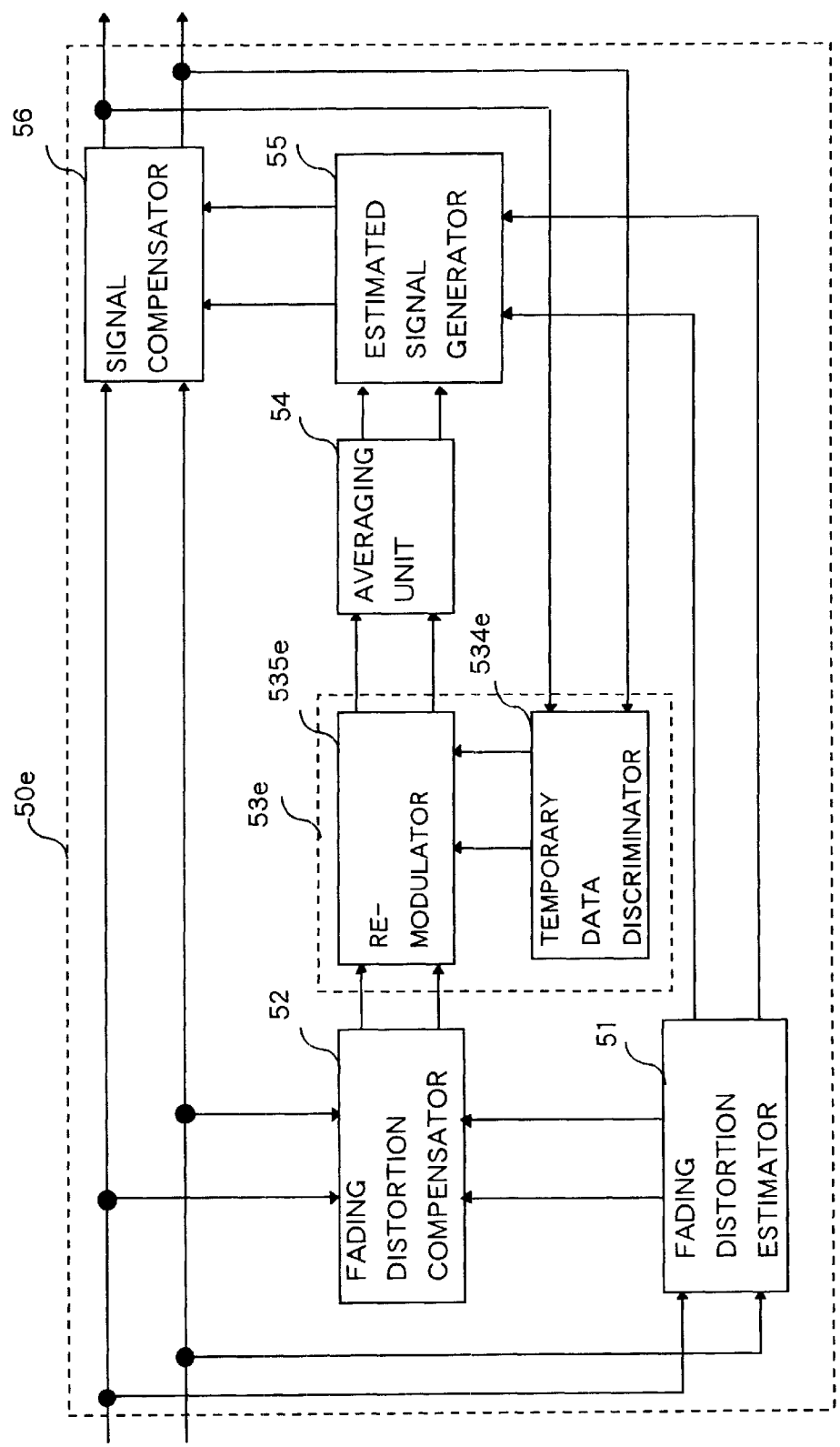
FIG. 14 shows a configuration of a carrier estimator according to the fifth embodiment of the invention.

FIG. 14 shows a configuration of another carrier estimator of the first embodiment performing the coherent detection of the received signal using the known signal inserted into the transmitted signals. The modulation component eliminator of the first embodiment is now configured as shown in FIG. 14.

In the figure, a reference numeral 534e shows a temporary data discriminator, and 535e shows a re-modulator. The other elements of the configuration of FIG. 14 are the same as elements of the first embodiment shown in FIG. 4.

An operation of a carrier estimator 50e will be explained in the following.

The temporary data discriminator 534e temporarily discriminates the transmitted signal from the output signal of the signal compensator 56. The re-modulator 535e eliminates the modulation component by re-modulating the signal using the decoded data discriminated and output by the temporary data discriminator 534e. This operation is represented by the following expression (30), where the output of the signal compensator 56 is $z_{RC}(k+m/N_R)$, and the signal of which the modulation component is eliminated is $z_{RF}(k+m/N_R)$.

$$z_{RF}\left(k + \frac{m}{N_R}\right) = z_{RE}\left(k + \frac{m}{N_R}\right)\exp\left[-j\left(\theta_D\left(k + \frac{m}{N_R}\right) + 45\right)\right] \quad (30)$$

$$\theta_D\left(k + \frac{m}{N_R}\right) = 90 \times \text{Int}\left[\text{mod}\left(\theta_{RC}\left(k + \frac{m}{N_R}\right), 360\right)/90\right]$$

$$\theta_{RC}\left(k + \frac{m}{N_R}\right) = \tan^{-1}\left[\frac{\text{Im}\left[z_{RC}\left(k + \frac{m}{N_R}\right)\right]}{\text{Re}\left[z_{RC}\left(k + \frac{m}{N_R}\right)\right]}\right]$$

As described above, after the output signal of the signal compensator is temporarily discriminated, the modulation component is eliminated by re-modulating the signal using the output from the temporary data discriminator, which enables the carrier estimator of the present embodiment to eliminate the modulation component more precisely than the fourth embodiment. Accordingly, the estimation error generated by the averaging unit can be reduced, and the performance of the receiver is improved. Further, the number of stages required for averaging to obtain the same performance can be decreased, thus the load of the averaging unit can be lessened.

Figure 15:
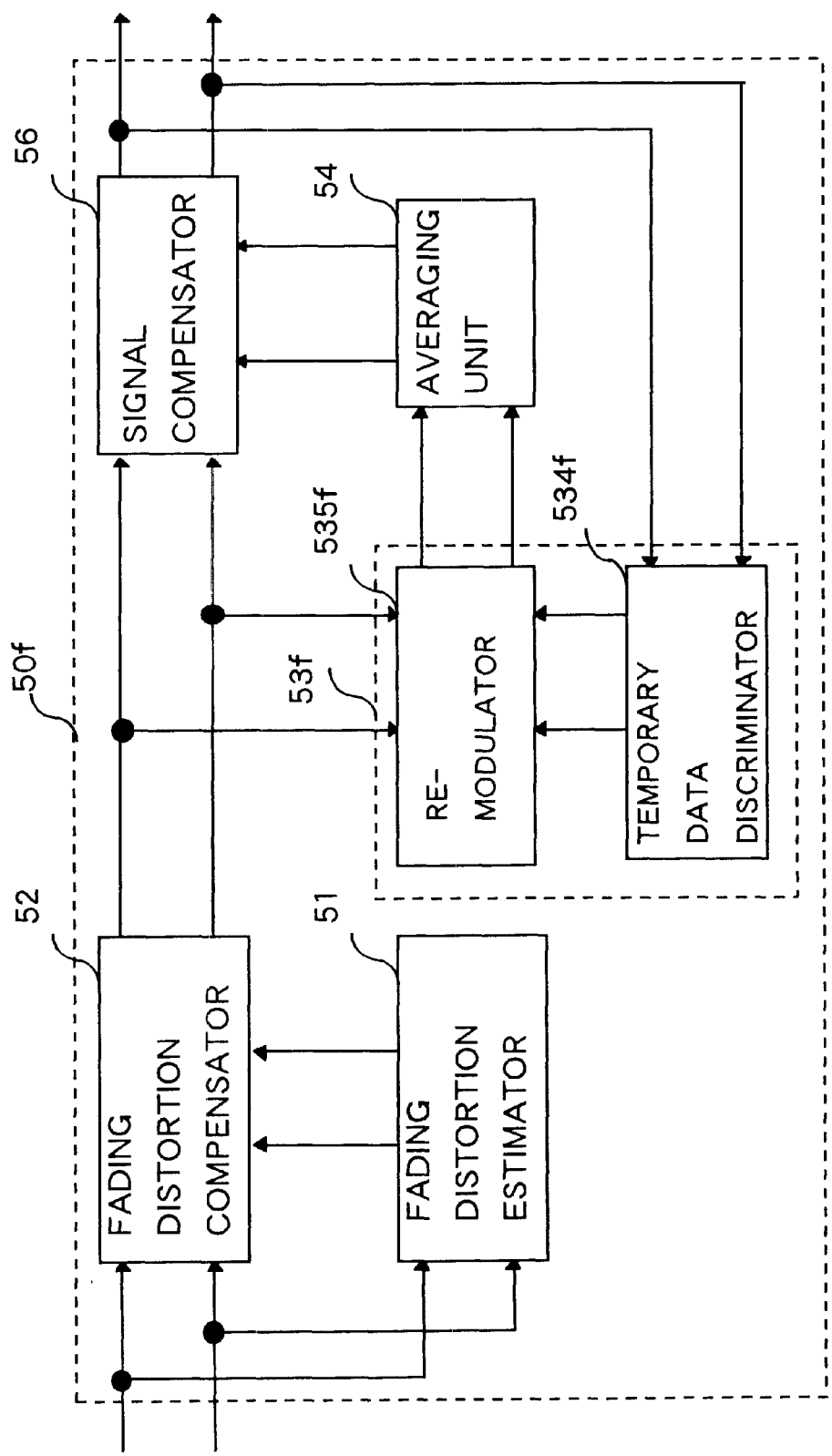
FIG. 15 shows another configuration of the carrier estimator according to the fifth embodiment.

FIG. 15 shows a configuration of another carrier estimator of the second embodiment, which performs the coherent detection of the received signal using the known signal inserted into the transmitted signals. The modulation component eliminator of the second embodiment is now configurated as shown in FIG. 15.

In the figure, a reference numeral 534f shows a temporary data discriminator, and 535f shows a re-modulator. The other elements of the configuration of FIG. 15 are the same as ones shown in FIG. 10.

In the following, an operation of a carrier estimator 50f will be explained.

The temporary data discriminator 534f temporarily discriminates the transmitting data from the output signal of the signal compensator 56. The re-modulator 535f eliminates the modulation component by re-modulating the signal using the decoded data discriminated and output by the temporary data discriminator 534f. These operations are performed in the same way as, for example, the demodulator of the fifth embodiment configured as shown in FIG. 14.

As described above, after the output signal of the signal compensator is temporarily discriminated, the modulation component is eliminated by re-modulating the signal using the output from the temporary data discriminator, which enables the carrier estimator of the present embodiment to eliminate the modulation component more precisely than the fourth embodiment. Therefore, the estimation error generated by the averaging unit can be reduced and the performance of the receiver is improved. Further, the number of stages required for averaging can be decreased, thus the load of the averaging unit can be lessened.

Embodiment 6

In the sixth embodiment, another demodulator will be explained, where the number of pieces of data to be averaged can be varied so as to perform more suitable averaging of the signal to the characteristic of each channel.

Figure 16:
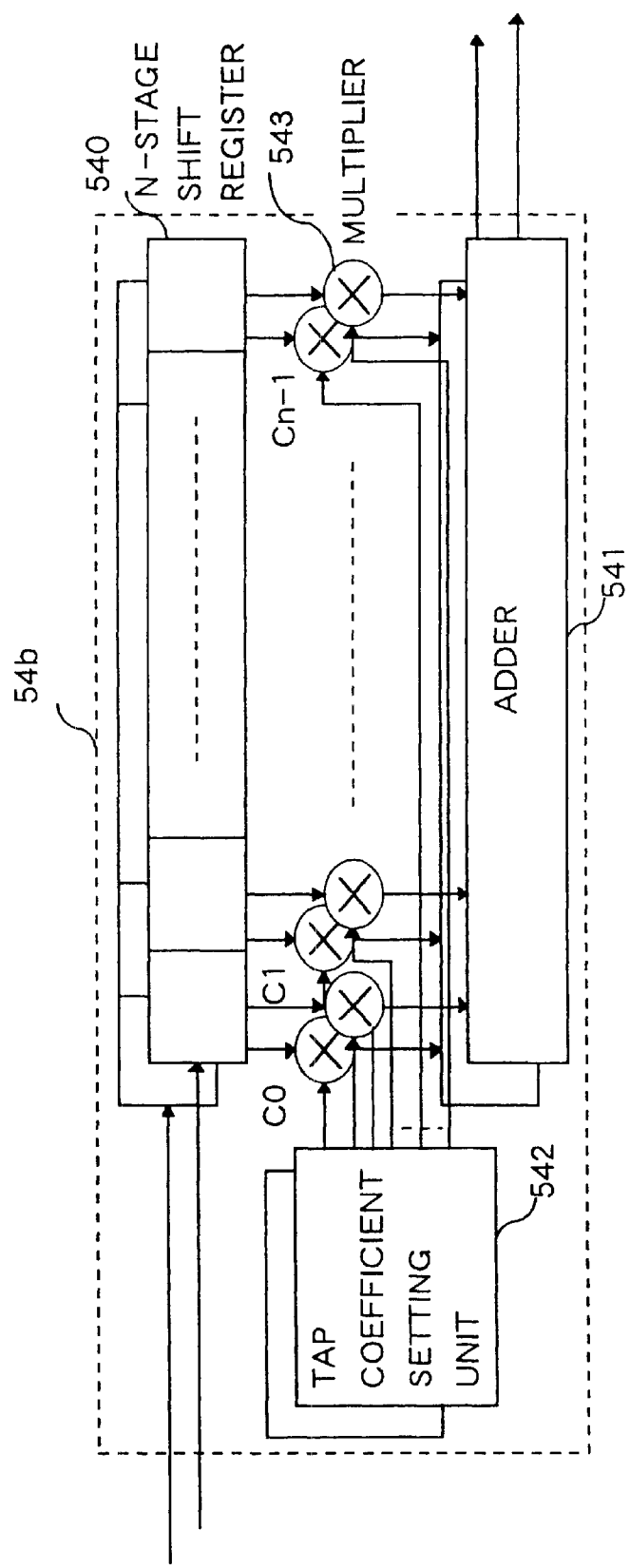
FIG. 16 shows a configuration of an averaging unit according to the sixth embodiment of the invention.

In the first and second embodiments, the carrier estimator performs the coherent detection of the received signal using the known signal inserted into the transmitted signals. On the contrary, the averaging unit of the sixth embodiment is configured as shown in FIG. 16. The other elements of the configuration of the sixth embodiment are the same as elements of the first embodiment shown in FIG. 4 or the second embodiment shown in FIG. 10.

In FIG. 16, a reference numeral 540 shows an N-stage shift register, 541 shows an adder, 542 shows a tap coefficient setting unit, and 543 shows a multiplier.

An operation of the averaging unit 54b will be explained below.

The N-stage shift register sequentially inputs each signal of I channel and Q channel output from the modulation component eliminator 53. The tap coefficient setting unit 542 outputs N tap coefficients, which can be set varied, corresponding to each shift register. The multiplier 543 multiplies N pieces of data stored in each shift register of the N-stage shift register 542, and N coefficients generated by the tap coefficient setting unit 542, respectively. The adder 541 adds N multiplied results supplied from the multiplier 543 and outputs the result of the addition.

As has been described, the demodulator of the sixth embodiment averages the signal, of which the modulation component was eliminated, using the N weighted coefficients set by the tap coefficient setting unit 542. The averaging process can be varied according to the channel condition by varying the number of pieces of data and the value of the weighted coefficients. Accordingly, the performance of the receiver has been improved.

Embodiment 7

In the configuration of FIG. 3, where the demodulator of the receiving side includes a Viterbi decoder, the error correction ability can be improved by generating soft decision data of the error correction code. In the seventh embodiment, a reliability factor is added to the received data input to the Viterbi decoder, which improves Viterbi decoding ability.

Figure 17:
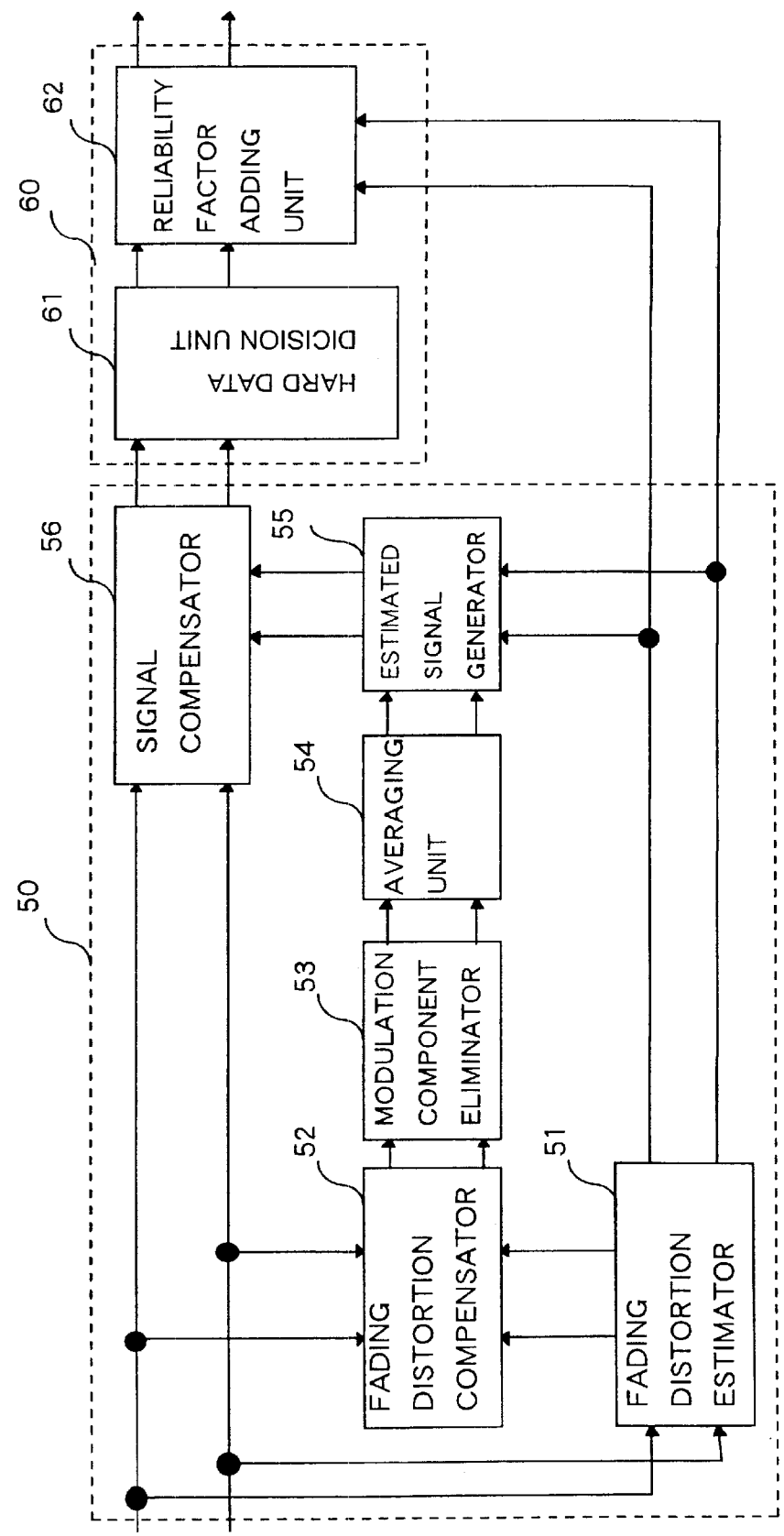
FIG. 17 shows a configuration of a data discriminator according to the seventh embodiment of the invention.

The demodulator of the first embodiment performs the coherent detection of the received signal using the known signal inserted into the transmitted signals. In the demodulator of the seventh embodiment, the data discriminator is configured as shown in FIG. 17.

In the figure, a reference numeral 61 shows a hard data decision unit and 62 shows a reliability factor adding unit. The other element of FIG. 17 are the same as the elements of the first embodiment shown in FIG. 4.

An operation of as data discriminator 60 will be explained in the following.

The hard data decision unit 61 discriminates the signal output from the signal compensator 56 by the hard decision data. The reliability factor adding unit 62 weights the reliability factor output from the fading distortion estimator 51 to the discriminated data supplied from the hard data decision unit 61, and the weighted data is output as the decoded data.

As has been described, in the demodulator of the seventh embodiment, after the data is processed hard decision data, the reliability factor is weighted to the data using the fading distortion information supplied from the fading distortion estimator. On Viterbi decoding, the Viterbi decoding can be performed by soft decision data with the reliability factor, so that the error correction ability is improved, and the performance of the receiver is also improved.

Figure 18:
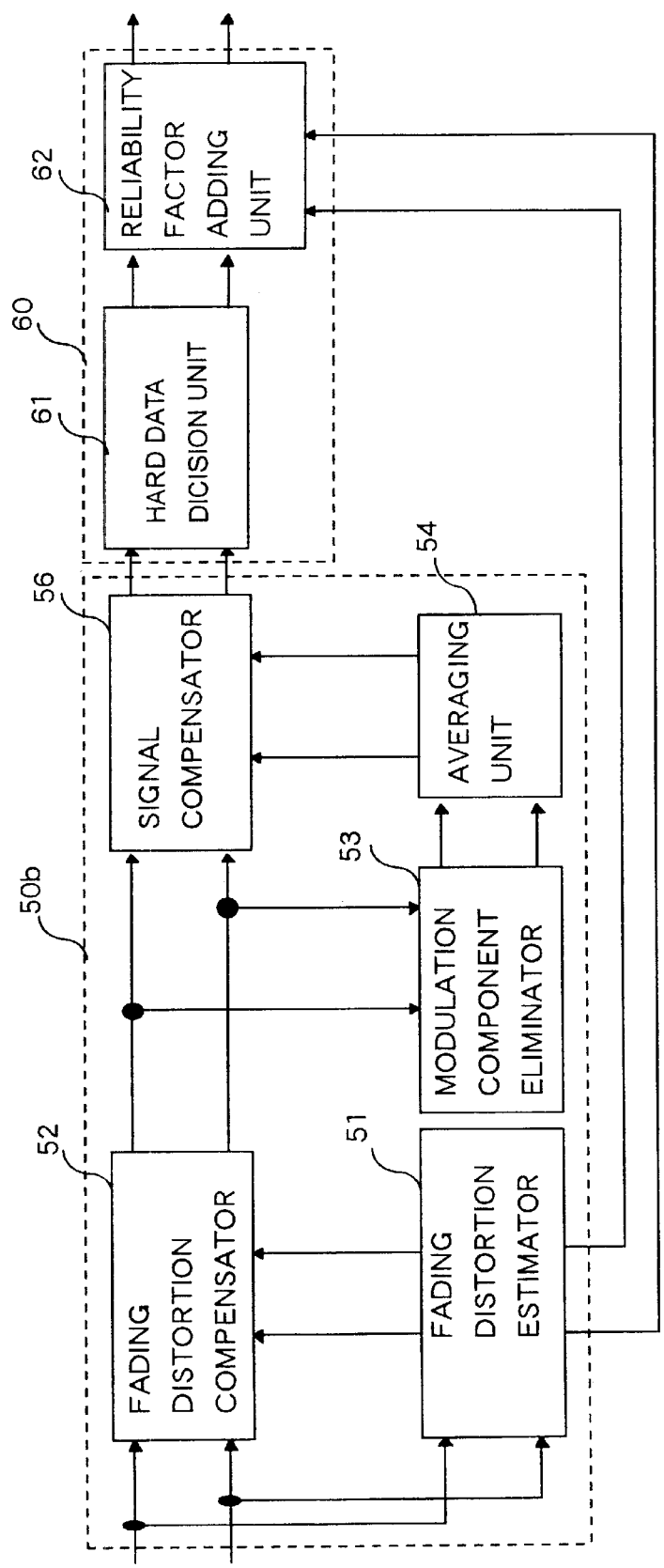
FIG. 18 shows another configuration of the data discriminator according to the seventh embodiment.

FIG. 18 shows another configuration of the demodulator of the second embodiment including the data discriminator as described above.

In the figure, a reference numeral 61 shows the hard data decision unit and 62 shows the reliability factor adding unit. The other elements are the same as the elements of the second embodiment configured as shown in FIG. 10.

An operation of the demodulator of FIG. 18 will be explained below.

The hard data decision unit 61 discriminates the signal supplied from the signal compensator 56 by hard decision data. The reliability factor adding unit 62 weights the amplitude factor to the discriminated data output from the hard data decision unit 61 using the amplitude factor of the fading distortion estimated by the fading distortion estimator 51, and the weighted data is output as the decoded data.

In the above way, in the demodulator of the seventh embodiment, the reliability factor is weighted using the fading distortion information, so that on Viterbi decoding, the performance of the Viterbi decoding is improved by implementing the soft decision data using the reliability factor.

Embodiment 8

Figure 19:
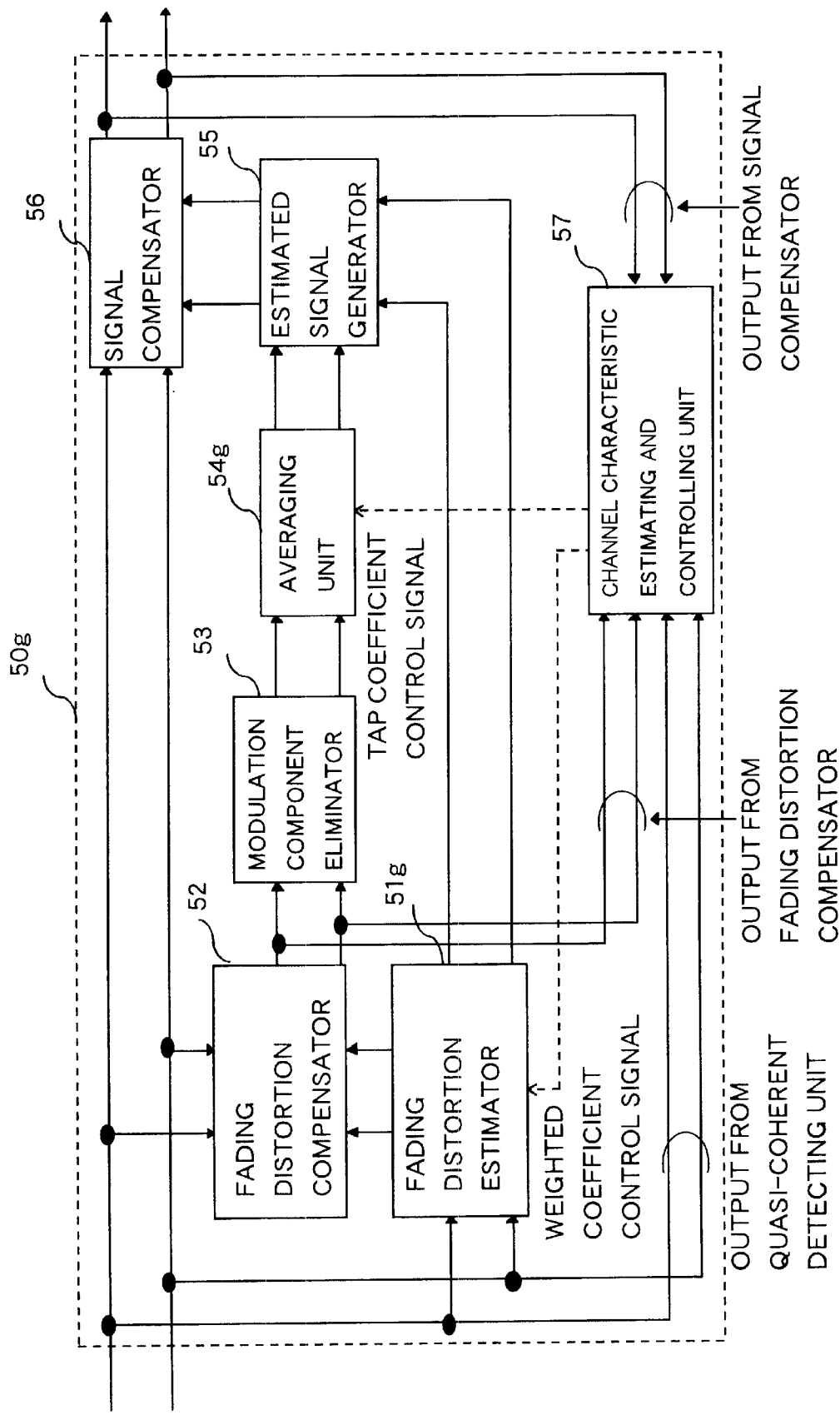
FIG. 19 shows a configuration of a carrier estimator according to the eighth embodiment of the invention.

In the eighth embodiment, another demodulator will be explained, where the fading distortion is estimated according to the variation of the characteristic of the channel varying in time and averaging parameters are adapted and controlled FIG. 19 shows a configuration of the carrier estimator according to the eighth embodiment performing the coherent detection of the received signal using the known signal inserted into the transmitted signals.

In the figure, a reference numeral 57 shows a channel characteristic estimating and controlling unit. The other element of FIG. 19 are the same as the ones of the first embodiment shown in FIG. 4.

An operation of the demodulator shown in FIG. 19 will be explained below.

The channel characteristic estimating and controlling unit 57 estimates the channel using the output signal of the quasi-coherent detecting unit 40, the output from the fading distortion compensator 52 and the output from the signal compensator 56. The weighted coefficient suitable to the present channel is set in the fading distortion estimator 51$g$ using the weighted coefficient control signal, and the averaging process suitable to the present channel is set in the averaging unit 54$g$ by the averaging coefficient control signal. Namely, the weighted coefficient of the weighted averaging unit 512 of the third embodiment shown in FIG. 11 is adaptably determined according to the channel condition. Or, tap coefficient generated by the tap coefficient setting unit 542 of the sixth embodiment shown in FIG. 16 is adaptably determined.

As has been described, in the demodulator of the eighth embodiment, the channel condition is always estimated in order to set the most suitable control signal to the condition, which enables the subsequent coherent detection to be performed according to the characteristic variation of the channel. Therefore, the most suitable receiving performance can be obtained on receiving the signal from the fading channel to the nonfading channel.

Figure 20:
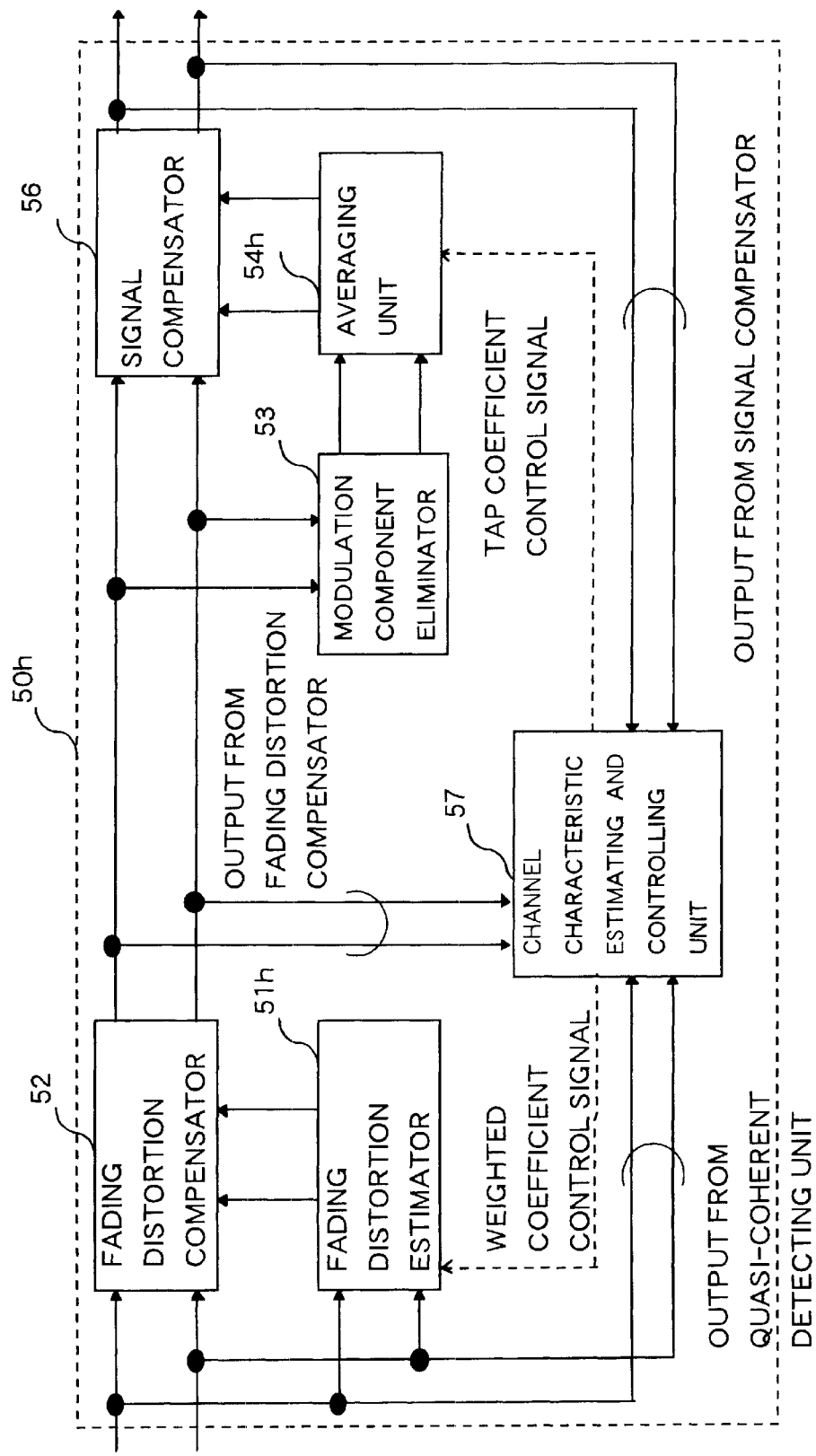
FIG. 20 shows another configuration of the carrier estimator according to the eighth embodiment.

FIG. 20 shows another configuration of the demodulator of the second embodiment, where the carrier estimator of the eighth embodiment is applied.

In the figure, a reference numeral 57 shows the channel characteristic estimating and controlling unit, and the other elements of FIG. 20 are the same as the elements of the second embodiment shown in FIG. 10.

An operation of the demodulator of FIG. 20 will be explained in the following.

The channel characteristic estimating and controlling unit 57 estimates the channel using the output signal from the quasi-coherent detecting unit 40, the output from the fading distortion compensator 52 and the output from the signal compensator 56. The weighted coefficient suitable to the present channel is set in the fading distortion estimator and the averaging process suitable to the present channel is set in the averaging unit.

As has been described, in the demodulator of the eighth embodiment, the subsequent coherent detection can be performed according the variation of the characteristic of the channel. Therefore, a high receiving performance is obtained on receiving the signal of wide range from the fading channel to the nonfading channel.

Embodiment 9

In the following embodiment, a detailed configuration of the channel characteristic estimating and controlling unit will be explained.

Figure 21:
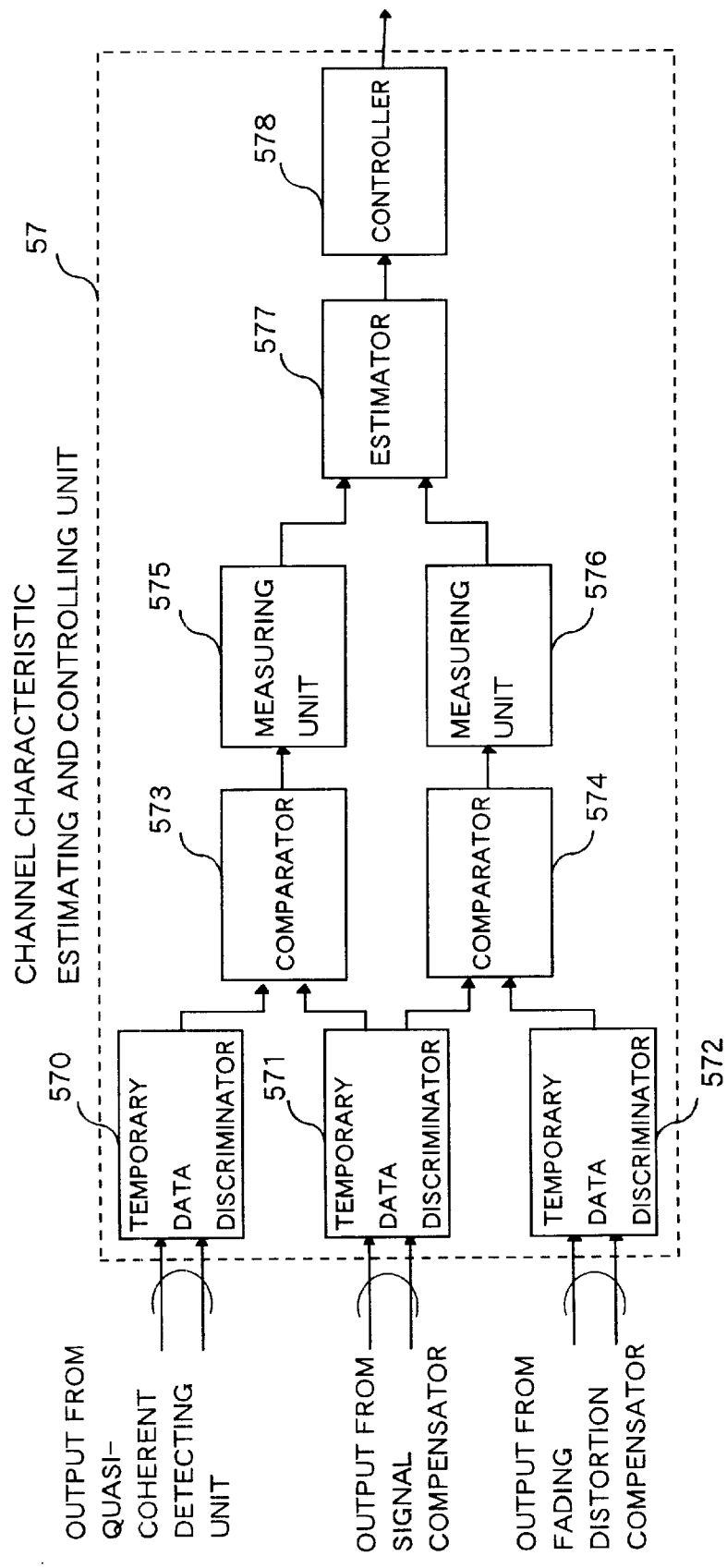
FIG. 21 shows a configuration of a channel characteristic estimator and controller according to the ninth embodiment of the invention.
Figure 22:
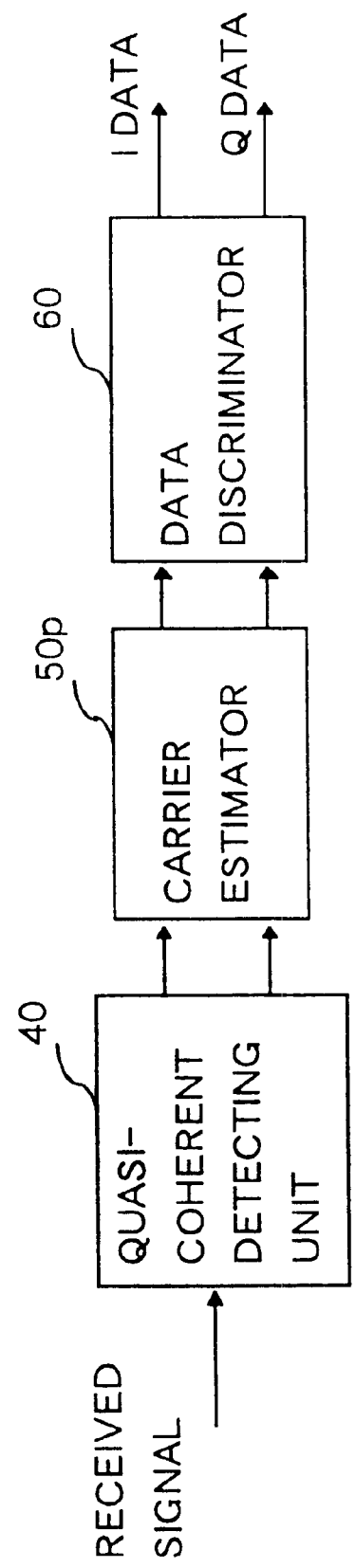
FIG. 22 shows a configuration of a receiver of the conventional art.
Figure 23:
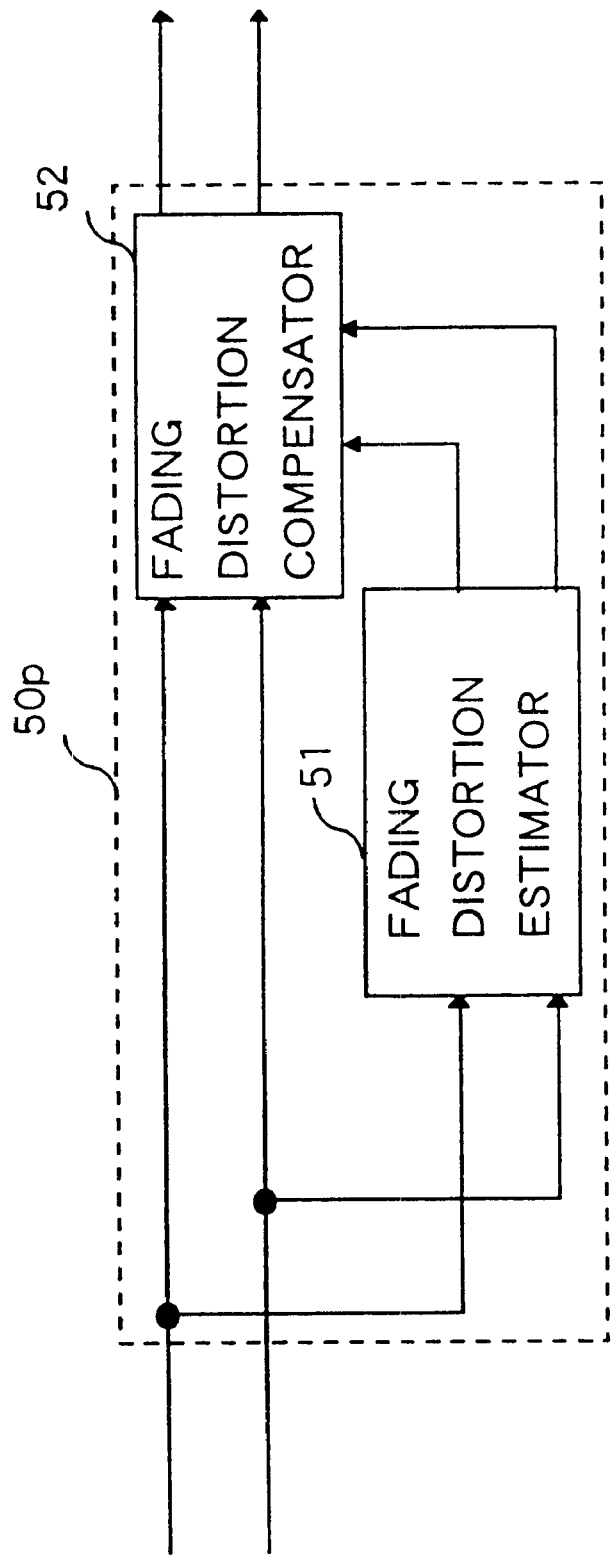
FIG. 23 shows a configuration of the fading distortion estimator and compensator according to the conventional art.

FIG. 21 shows a configuration of another channel characteristic estimating and controlling unit according to the present embodiment. The other elements of the demodulator without shown in FIG. 21 is the same as the elements of the eighth embodiment shown in FIG. 19 or FIG. 20.

In the figure, reference numerals 570, 571 and 572 are temporary data discriminators, 573 and 574 are comparators, 575 and 576 show measuring units, 577 shows an estimator, and 578 shows a controller.

An operation of the channel characteristic estimating and controlling unit shown in FIG. 21 will been explained below.

The temporary data discriminator 570 temporarily discriminates the output from the quasi-coherent detecting unit 40, the temporary data discriminator 571 temporarily discriminates the output from the signal compensator, and the temporary data discriminator 572 temporarily discriminates the output from the fading distortion compensator 52. The comparator 573 compares the outputs from the temporary data discriminators 570 and 571 and the comparator 573 outputs the comparison result. The comparator 574 compares the outputs from the temporary data discriminators 571 and 572 and the comparator 574 outputs the comparison result. The measuring unit 575 measures the comparison result supplied from the comparator 573, and the measuring unit 576 measures the comparison result supplied from the comparator 574. The estimator 577 estimates the channel condition, which varies, using the measured result of the measuring units 575 and 576. The controller 578 determines the weighted coefficient of the fading distortion estimator or tap coefficient of the averaging unit based on the channel condition estimated by the estimator 577, and parameters of the coefficient are respectively set.

As has been described, in the demodulator of the ninth embodiment, based on the demodulated data, which was compensated and output by the signal compensator, the data before fading distortion compensation and the data after fading distortion compensation are compared, the comparison result is measured, and the channel condition is estimated. The fading distortion can be estimated using the amount of characteristic improvement by the fading distortion compensation, and C/N can be also estimated using the amount of characteristic improvement by the averaging process. The parameters suitable to the channel condition can be set, and the demodulator having the most suitable receiving performance to the channel including wide range of characteristic from the fading channel to the nonfading channel.

As has been described, according to the present invention, after the fading distortion is compensated using the known signal, the signal is processed averaging to detect the estimation error caused by the thermal noise. The obtained estimation error is compounded to the estimated value supplied from the fading distortion estimator to obtain the reference signal to compensate the received signal. The estimation error caused by the. thermal noise, which was not sufficiently compensated conventionally by the fading distortion compensator, can be detected and the degradation of the characteristic caused by the fading and the thermal noise can be reduced.

Further, the demodulator of the invention first compensates the fading distortion using the known signal, and then averages the signal to detect the estimation error caused by the thermal noise, and the signal is compensated. The demodulator can detect the estimation error caused by the thermal noise and can reduce the degradation of the characteristics caused by the fading and the thermal noise by a simpler configuration.

Further, the demodulator of the invention averages the estimated value of the fading distortion obtained by the known signal block by adding the weighted value to the previous and subsequent signal blocks of the known signal block. The demodulator can reduce the degradation of the characteristic caused by the thermal noise with adapting the fading variation.

Further, after the output signal of the fading distortion compensator is temporarily discriminated, the modulation component is eliminated by re-modulating the signal using the output from the temporary data discriminator. Since the demodulator of the present invention can eliminate the modulation component more precisely than Nth power law and so on, which reduces the estimation error generated by the averaging unit. Further, the number of stages required for averaging can be decreased, thus the load of the averaging unit can be lessened.

Further, after the data is temporarily discriminated using the output signal from the signal compensator, the modulation component is eliminated by re-modulating the signal using the output from the temporary data discriminator, which enables the demodulator of the present invention to eliminate the modulation component more precisely. Therefore, the estimation error generated by the averaging unit can be reduced. Further, the number of stages required for averaging can be decreased, thus the load of the averaging unit can be lessened.

Further, the demodulator of the present invention averages the signal, of which the modulation component was eliminated, by multiplying tap coefficients. The averaging can be processed according to the channel condition, which improves the performance of the receiver.

Further, in the demodulator of the present invention, the reliability factor is weighted to the data, which was processed by the hard data decision by the data discriminator, using the fading distortion information supplied from the fading distortion estimator. On Viterbi decoding, the Viterbi decoding is implemented by soft decision data according to the reliability factor, so that the error correction ability is improved, and the performance of the receiver has been improved.

Yet further, in the demodulator of the present invention, the channel condition is always estimated in order to set the most suitable control signal to the condition, which enables the subsequent coherent detection can be performed based on the characteristic variation of the channel. Therefore, the most suitable receiving performance can be obtained on receiving the signal from the fading channel to the nonfading channel.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

What is claimed is:

1. A demodulator for estimating a carrier, and for coherent detection using specific symbols inserted in received signals, having a fading distortion estimator and a fading distortion compensator using an output of the fading distortion estimator, the demodulator comprising:

(1) a modulation component eliminator for filtering the received signals outputted from the fading distortion compensator, to produce estimated-received signals;

(2) an averaging unit for averaging the estimated-received signals to produce a mean (or average) value; and (3) a signal compensator for compensating the received signals using the mean value.

2. The demodulator according to claim 1, further comprising an estimated signal generator for generating estimated signal using the mean value and the output of the fading distortion estimator, and wherein the signal compensator uses the estimated signal for compensating the received signals.

3. The demodulator according to claim 1, wherein the fading distortion estimator has a distortion detecting/averaging unit for having an average distortion value of the specific symbols, and has a weighted averaging unit for accumulating the average distortion value after multiplying with weight factors.

4. The demodulator according to claim 1, wherein the modulation component eliminator has a temporary data-discriminator for discriminating decoded data using the output of the fading distortion compensator, and has a re-modulator for filtering the output of the fading distortion compensator using the decoded data.

5. The demodulator according to claim 1, wherein the modulation component eliminator has a temporary data-discriminator for discriminating decoded data using an output of the signal compensator, and has a re-modulator for filtering the output of the fading distortion compensator using the decoded data.

6. The demodulator according to claim 1, wherein the averaging unit has a tap-coefficient setting unit for setting values of tap-coefficient multipliers, and wherein the averaging unit accumulates the estimated-received signals after multiplying with the tap-coefficient multipliers.

7. The demodulator according to claim 1, wherein the demodulator has a Viterbi decoder, further comprising a hard-data decision unit for discriminating temporary received data, and a reliability factor adding unit for Viterbi decoder using the temporary received data.

8. The demodulator according to claim 1, wherein the fading distortion estimator has weight factors, further comprising a channel characteristic estimating/controlling unit for estimating characteristic of channel, and for controlling weight factors in the fading distortion estimator using the received signals, the output of the fading distortion compensator and the output of the signal compensator.

9. The demodulator according to claim 6, further comprising a channel characteristic estimating/controlling unit for estimating characteristic of channel, and for controlling tap-coefficients in the averaging unit using the received signals, the output of the fading distortion compensator and the output of the signal compensator.

10. The demodulator according to claim 8, wherein the channel characteristic estimating/controlling unit has a temporary-data discriminator, a comparator and an estimator, and measures characteristic variation of the channel.

11. A demodulation method in a demodulator having a fading distortion estimator and a fading distortion compensator using an output of the fading distortion estimator, comprising:

a modulation component eliminating step for filtering received signals including specific symbols from the fading distortion compensator to produce estimated-received signals;

an averaging step for having a mean value of the estimated-received signals; and a signal compensation step for compensating the received signals using the mean value of the estimated-received signals.

12. The demodulation method according to claim 11, further comprising an estimated signal generating step for generating estimated signals with the mean value of the estimated-received signals and with the output of the fading distortion estimator, and wherein the signal compensation step uses the estimated signals.

* * * * *